July 3, 1951 L. LEE, II 2,558,968
APPARATUS FOR CONTROLLING THE INTAKE MANIFOLD
PRESSURE OF INTERNAL-COMBUSTION ENGINES
Filed Dec. 13, 1943 6 Sheets-Sheet 2
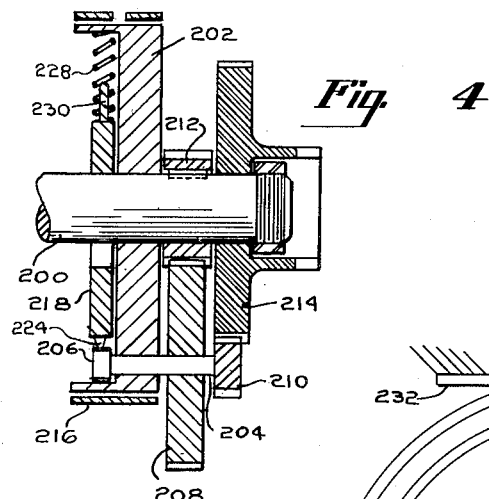
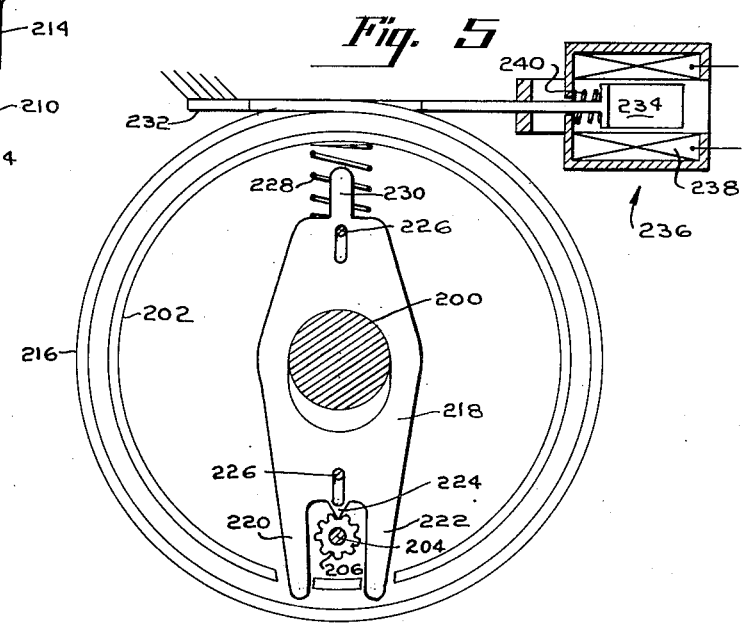
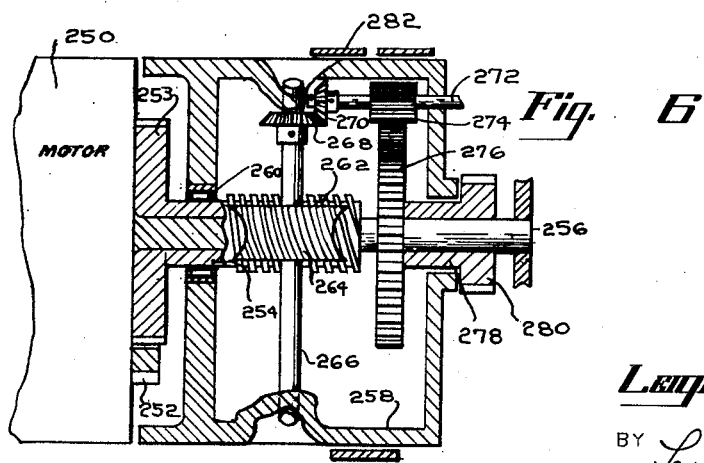
INVENTOR
LEIGHTON LEE II
BY Lester W Clark
AGENT

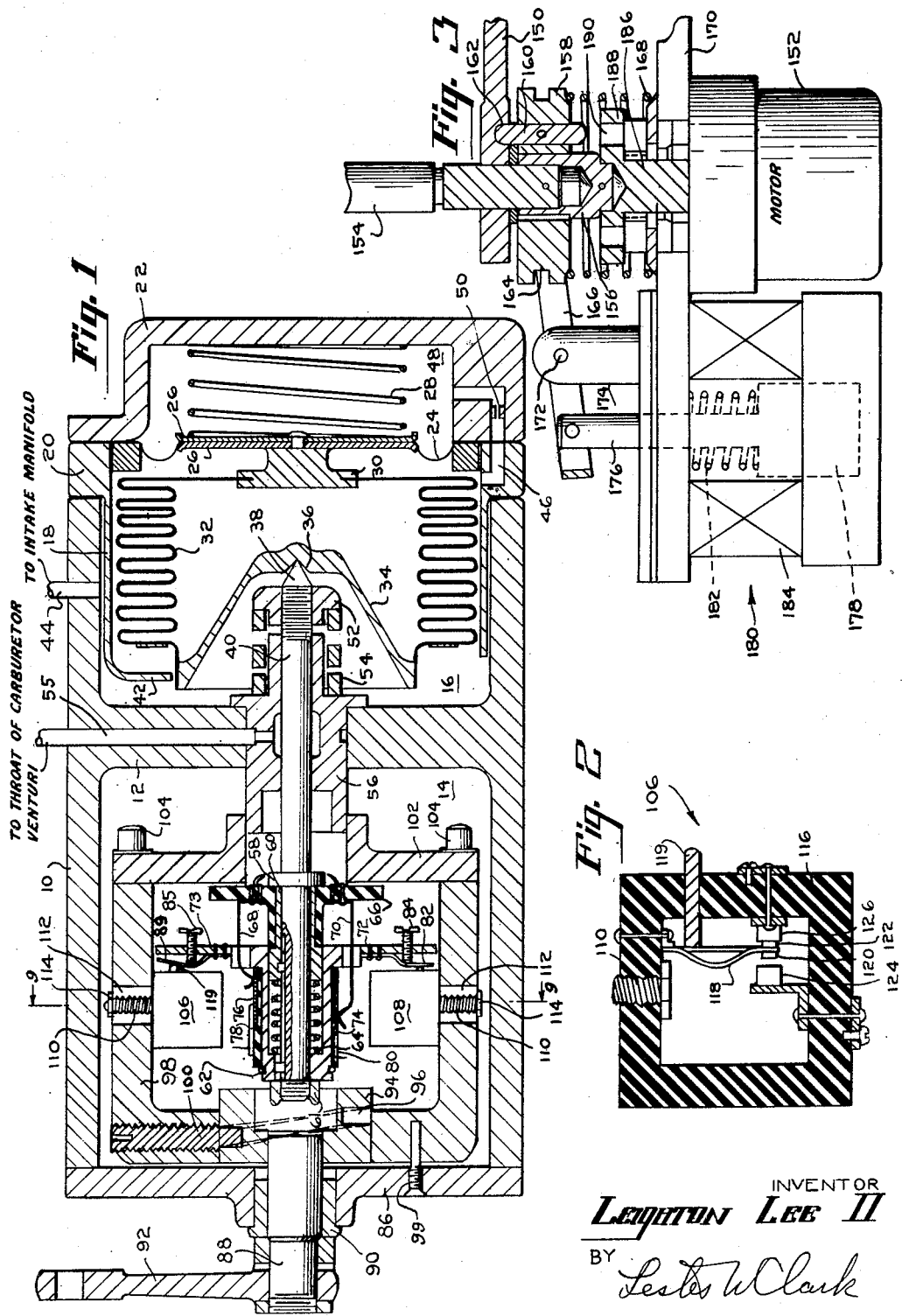

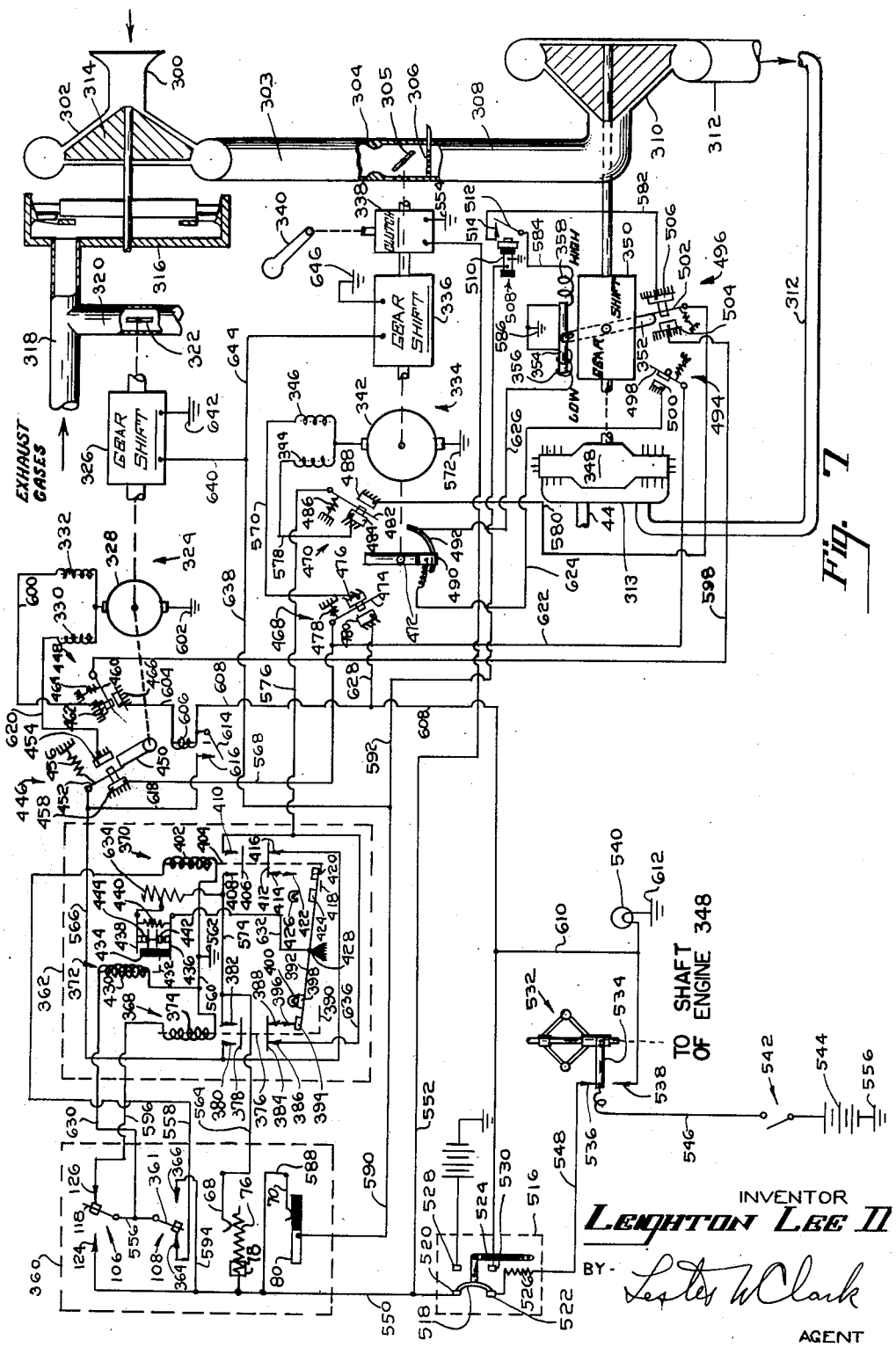

July 3, 1951 L. LEE, II 2,558,968
APPARATUS FOR CONTROLLING THE INTAKE MANIFOLD
PRESSURE OF INTERNAL-COMBUSTION ENGINES
Filed Dec. 13, 1943 6 Sheets-Sheet 5

INVENTOR.
LEIGHTON LEE II
BY
Lester W Clark
AGENT

INVENTOR.
LEIGHTON LEE II
BY
Lester W Clark
AGENT

Patented July 3, 1951

2,558,968

UNITED STATES PATENT OFFICE 2,558,968

APPARATUS FOR CONTROLLING THE INTAKE MANIFOLD PRESSURE OF INTERNAL-COMBUSTION ENGINES

Leighton Lee, II, Meriden, Conn., assignor, by mesne assignments, to Niles-Bement-Pond Company, West Hartford, Conn., a corporation of New Jersey Application December 13, 1943, Serial No. 514,022

53 Claims. (Cl. 60—13)

1

The present invention relates to automatic control apparatus, and particularly to a system for controlling the intake manifold pressure in an internal combustion engine.

An object of the present invention is to provide improved means for controlling the throttle of an internal combustion engine so as to maintain a substantially constant intake manifold pressure. Another object is to provide an improved system for controlling the intake manifold pressure in an engine provided with a throttle and with a supercharger for increasing the intake manifold pressure.

A further object is to provide improved means for controlling the manifold pressure in an engine provided with a throttle, a turbine driven supercharger, and another supercharger driven by the engine thru a variable speed ratio transmission.

Another object of the invention is to provide an improved intake manifold pressure control system including means responsive to the rate of change of the intake manifold pressure for anticipating further changes in that pressure.

Another object of the present invention is to provide a system for controlling an electrical motor in accordance with the variations of a variable condition, including improved means for varying the speed of the motor in accordance with the departure of the condition from a predetermined value in order to prevent "hunting." A further object is to provide improved means for dynamically braking such a motor so as to stop it suddenly upon restoration of the controlling condition to its selected value.

A further object of the invention is to provide improved mechanism for operating a control device in response to a variable condition.

A further object of this invention is to provide improved means for changing the gear ratio between a motor and a power output shaft driven by the motor.

A further object of this invention is to provide, in an intake manifold pressure control system of the type described, improved signal means for indicating the existence of a dangerous condition in the system.

Figure 8:
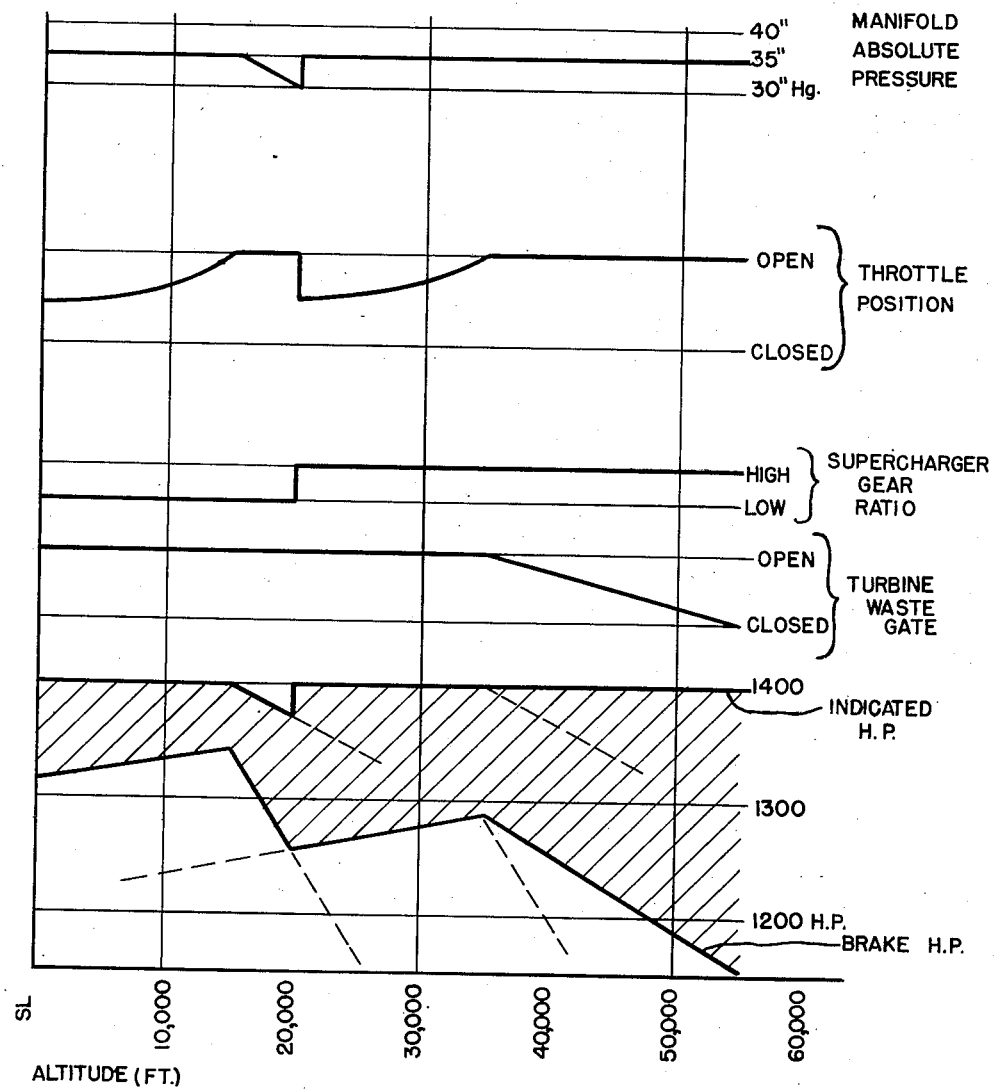
Figure 9:
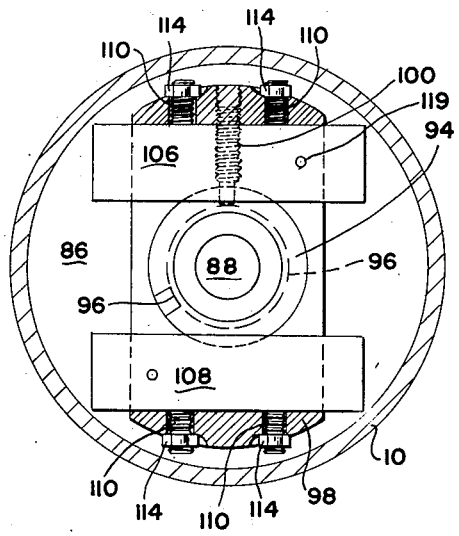
Figure 10:
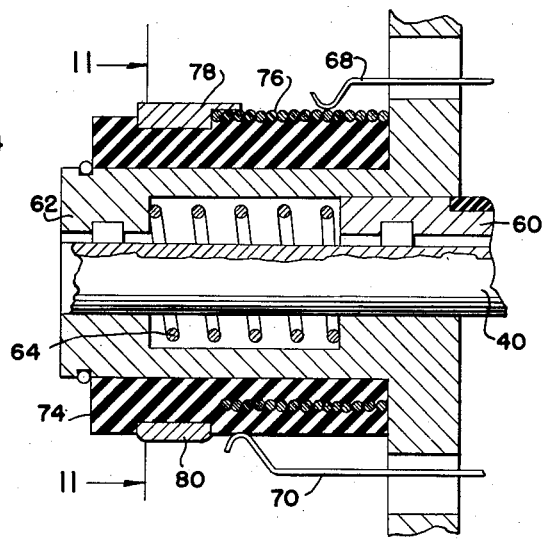
Figure 11:
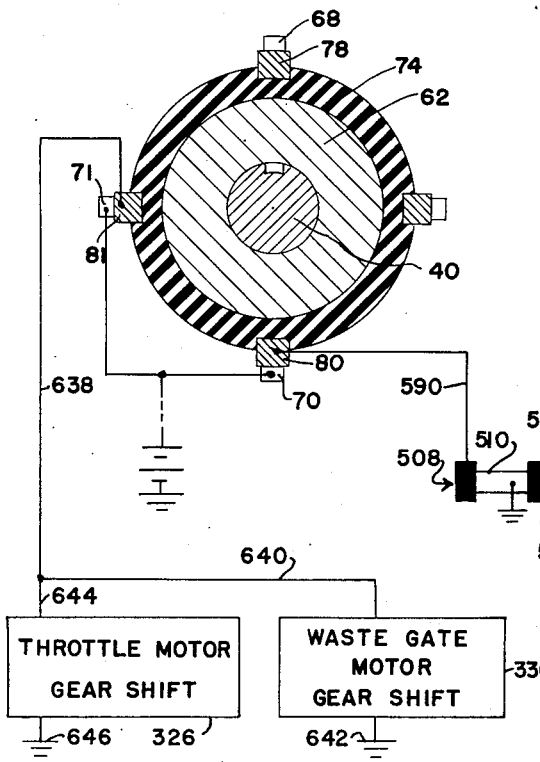
Figure 12:
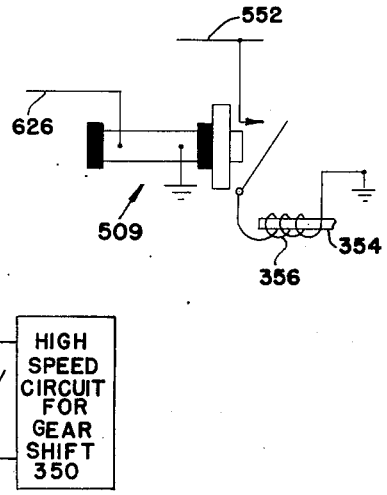
Figure 13:
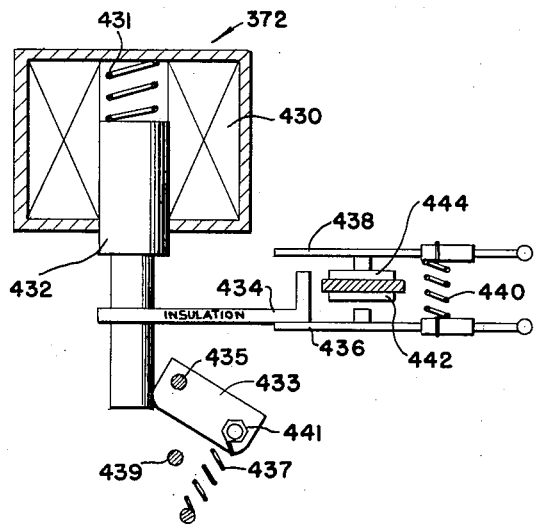
Figure 14:
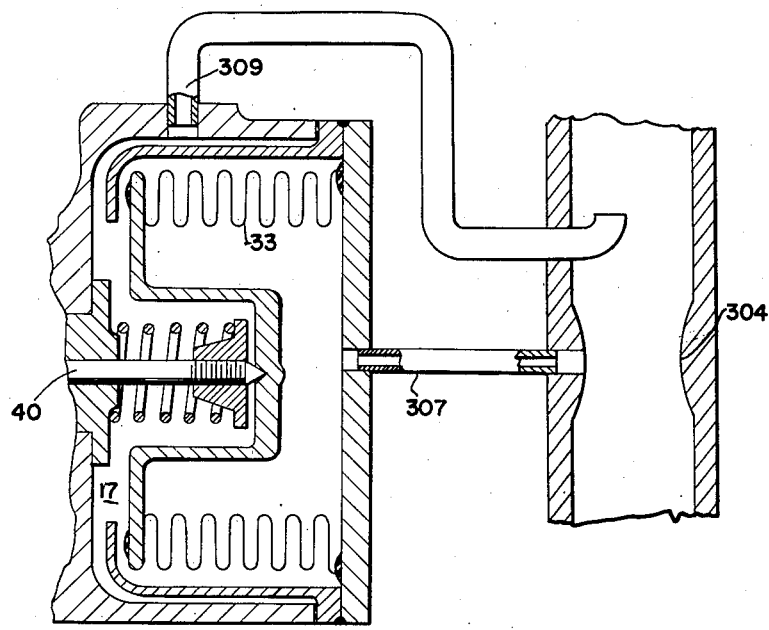

Other objects and advantages of this invention will become apparent from a consideration of the appended specification, claims and drawings, in which Figure 1 is a cross-sectional view of a pressure responsive electrical control device embodying certain features of my invention, Figure 2 is a cross-sectional view, on an enlarged scale, of a switch shown diagrammatically in Figure 1, Figure 3 is an elevational view, with certain parts shown in cross-section, of a two-way clutch operating mechanism used in connection with my invention, Figure 4 is a cross-sectional view of a two-speed gear shifting arrangement embodying certain features of my invention, Figure 5 is an elevational view of the device shown in Figure 4 looking at the left side of the device, as viewed in Figure 4, Figure 6 is a cross-sectional view of a modified form of gear shift embodying certain features of my invention, Figure 7 is a somewhat diagrammatic illustration of an intake manifold pressure control system embodying my invention and the electrical control circuits used in connection with it, Figure 8 is a graphical illustration of the relationships between various controlled conditions in a system constructed in accordance with my invention, Figure 9 is a cross-sectional view taken on the line 9—9 of Figure 1, looking in the direction of the arrows, certain parts being omitted for clarity, Figure 10 is a view, on an enlarged scale, of the switch and variable resistance structure shown in Figure 1, Figure 11 is a cross-sectional view on the line 11—11 of Figure 10, looking in the direction of the arrows, Figure 12 is a diagrammatic illustration of a modified form of electrical circuit for controlling the gear shift, which may be used in place of that shown in the system of Figure 7, Figure 13 illustrates, somewhat diagrammatically, the mechanical structure of a relay which may be used as the relay for 372 of Figure 7, and Figure 14 illustrates a modification of the control device shown in Figure 1.

Referring to Figure 1, there is shown a generally cylindrical casing 10 having a transverse wall 12 dividing its interior into two chambers 14 and 16. A sleeve 18, having an external diameter smaller than the internal diameter of the chamber 16, is provided with a flange 20 which rests against the right end of casing 10 so that the main portion of the sleeve 18 projects within the chamber 16. A cover 22 engages the right face of the flange 20, so as to complete the enclosure of chamber 16. The cover 22, flange 20 and cylinder 10 may be held together by bolts or any other suitable means (not shown). A suitable gasket may be provided between the flange 20 and the casing 10. A flexible diaphragm 24 is clamped between the cover 22 and the flange 20. The central portion of diaphragm 24 is clamped between a pair of discs 26. A spring 28 is held under compression between the right hand disc 26 and the inside surface of cover 22.

A button 30 is attached by any suitable means to the center of the discs 26, and carries a flexible bellows 32. The opposite end of bellows 32 is closed by a generally conical member 34. The member 34 has a crater 36 at its center to receive the pointed end 38 of a rod 40. The sleeve 18 is provided with a plurality (preferably three) of prongs 42 which are bent over so as to limit the expansion of the bellows 32.

The bellows 32 is sealed so that it expands and contracts with variations in the pressure in the chamber 16. The bellows 32 might be evacuated or filled with fluid under any desired pressure, but I have found it desirable, for the purposes of the present control problem, to fill it with an inert fluid such as nitrogen at a pressure substantially greater than the maximum pressure expected in the chamber 16. The interior of chamber 16 is connected thru a conduit 44 to a source of fluid under pressure, which in the present instance is the intake manifold 313 of an internal combustion engine 348 (see Figure 7). The flange 20 and the cover 22 are bored to provide a conduit 46 connecting the chamber 16 and a chamber 48 formed between the cover 22 and diaphragm 24. A fixed restriction 50 is provided in the conduit 46 to delay the flow of fluid therethru.

A spring retainer 52 is threaded on the rod 40 near its right hand end. A spring 54 is held in compression between the retainer 52 and a bushing 56 which surrounds the rod 40 where it passes thru wall 12. The spring 54 acts in a direction to compress the bellows 32. The wall 12 and the bushing 56 are drilled to provide a drain conduit 55, which may be connected to the throat of the venturi in the carburetor attached to the engine on which this device is used.

Within the chamber 14, the rod 40 is provided near its center with a flange 58. A nut 61 is threaded on the left end of the rod 40. A sleeve 60 surrounds the rod 40 adjacent the flange 58 and another sleeve 62 surrounds the rod 40 adjacent the nut 61. The sleeves 60 and 62 are partially telescoped together, and a spring 64 is retained in compression between the two sleeves. (See Figure 10.) The sleeves 60 and 62 are keyed to the rod 40 to prevent any relative rotational movement, but both sleeves are longitudinally slidable with respect to each other and the rod 40. The sleeve 60 carries at its right hand end a collar of electrically insulating material, having a pair of extensions 66, which carry elongated contact members 68 and 70, of electrically conductive material. The contact members 68 and 70 are bent over and extend laterally thru apertures in extensions 72 and 73 carried by the sleeve 62. The sleeve 62 carries an outer concentric sleeve 74, of electrically insulating material. An electrical resistance element 76 is wound on the sleeve 74, and is molded therein so that the portions of its turns under the contact member 68 are exposed so that they may be engaged by that contact member. The sleeve 74 also carries contact members 78 and 80. The contact 78 is on the same side of sleeve 74 as the contact member 68, while the contact 80 is on the same side of sleeve 74 as contact member 70.

The extension 72 on sleeve 62 carries a leaf spring 82, which is attached to the extension 72 only at its upper end. The spacing between the lower end of leaf spring 82 and the extension 72 may be adjusted by means of a screw 84 which is threaded thru the extension 72, and whose end engages the leaf spring 82.

The extension 73 on the sleeve 62 is diametrically opposite the extension 72 and carries a similar leaf spring 89 adjustable by means of a screw 85.

The left end of chamber 14 is enclosed by a cover 86. A shaft 88 extends thru the cover 86, being journaled in a bearing 90 in a central aperture in the cover 86. A lever arm 92 is attached to the outer end of the shaft 88. A cylindrical block 94 is attached to the inner end of the shaft 88 and rotates therewith. The block 94 is provided with a helical groove 96. A U-shaped member 98 is provided with an aperture in the center of the bottom of the U which fits the outer diameter of the block 94. The U member 98 carries a dog point set screw 100 whose inner end rides in the groove 96 in the block 94. The member 98 is prevented from rotation by means of one or more pins 99 mounted on the cover 86 and extending into a recess in the member 98. The open end of the U-shaped member 98 is bridged by a plate 102 held in place by bolts 104.

There are mounted on the inner surfaces of the arms of the U-shaped member 98 a pair of switches 106 and 108. These switches are mounted at diametrically opposite points so as to be aligned with the extensions 72 and 73 on the sleeve 62.

The switches 106 and 108 are single-pole, double-throw switches of the snap-action type. For example, I have found the switches which are manufactured commercially under the name "Micro-Switch" to be satisfactory for this purpose.

Each of the switches 106 and 108 is attached to a pair of bolts 110 which extend thru slots 112 in the member 98. One or more nuts 114 engages each bolt 110 outside the member 98. By loosening the nuts 114, the bolts 110 may be moved in the slots 112 longitudinally of the member 98, and the position of either switch within the member 98 may be thereby adjusted.

The details of the construction of the switch 106 are shown, somewhat diagrammatically, in Figure 2. In that figure it may be seen that the switch 106 includes a casing of electrically insulating material. A switch finger 118 is attached at one end to a suitable bracket mounted in the casing 116, and carries at its opposite end a pair of contacts 120 and 122, which cooperate respectively with stationary contacts 124 and 126. The stationary contacts 124 and 126 are mounted on suitable brackets. The brackets which support the switch finger 118 and the contacts 124 and 126 are connected to suitable electrical conductors which extend to binding posts mounted on the exterior of the casing 116. The finger 118 is self-biased into engagement with contact 126, but may be moved into engagement with contact 124 by means of an operating pin 119.

Operation of Figures 1 and 2

When the parts are in the positions shown in Figure 1, the push button 119 of switch 106 is in the position illustrated in detail in Figure 2, so that switch finger 118 is in engagement with contact 126. In the switch 108, on the other hand, the push button is in its inward position, and its associated switch finger is in a position corresponding to that of finger 118 when it engages contact 124. The switches 106 and 108 control suitable mechanism for varying the pressure supplied thru condit 44 to chamber 16, as described hereinafter in connection with Figure 7. The control apparatus is so arranged that when the switches are in the position illustrated in Figure 1, the pressure varying mechanism is stationary. Therefore, the position of the apparatus which is illustrated in Figure 1 is hereinafter referred to as the neutral position.

When the sleeves 60 and 62 are against their respective stops 58 and 61, as illustrated in Figure 1, the distance between the right hand surface of sleeve 66 and the leaf springs 82 and 89 is slightly less than the distance between the left hand surface of plate 102 and the push buttons 119 of switches 106 and 108. Because of this arrangement of the parts, when the apparatus is in its neutral position, there is no external frictional force applied to the rod 40, and the only external spring force is that due to the leaf springs 82 and 89, which is so small in comparison with the force of spring 54 as to be negligible. Therefore the neutral position of the rod 40 is affected only by the pressure in chamber 16 and is not affected to any substantial degree by any external frictional or spring forces which might tend to introduce a hysteresis into the operation of the system.

Upon an increase in pressure in chamber 16, the bellows 32 collapses slightly, and the rod 40 moves to the right. The sleeve 60 cannot follow the rod in this direction since its movement is limited by the engagement of extensions 66 with the plate 102. The sleeve 62 is engaged by the nut 61, however, and is carried thereby to the right with the rod 40. As the movement of rod 40 continues the push button of switch 108 is released by the leaf spring 82 and the switch 108 is thereby operated to change its circuit closing position by its own internal spring. Operation of this switch causes the pressure controlling means to respond so as to decrease the pressure in chamber 16 and thereby restore the rod to the neutral position shown in the drawing.

As the pressure in chamber 16 increases, this increase is not immediately communicated to chamber 48, but is delayed by the restriction 50. Therefore, a pressure differential exists across diaphragm 24, tending to move the diaphragm to the right against the spring 28 and thereby causing an additional movement of bellows 32 and rod 40 to the right. The pressure difference across diaphragm 24 is proportional to the rate of change of pressure in chamber 16. This pressure differential causes an additional movement of rod 40 which is proportional to that rate of change and which anticipates a further change in the same direction by an amount dependent upon that rate.

Upon a decrease in pressure in chamber 16, the bellows 32 expands and moves the rod 40 to the left. The leaf spring 89 then moves the button 119 to the left, operating switch 106. Further movement of sleeve 62 to the left is then prevented by the engagement of extensions 72 and 73 with the buttons of switches 106 and 108. The sleeve 60 is engaged by stop 58 on rod 40 however, and continues to move to the left after motion of extension 73 has stopped. The spring 64 compresses and permits relative movement of the two sleeves. Operation of switch 106 as described causes the pressure controlling means to respond so as to increase the pressure in chamber 16 and thereby restore the rod 40 to the neutral position shown in the drawing.

In addition to operating the switches 106 and 108, a movement of rod 40 in either direction from the position shown in the drawing causes the contact member 68 to move along the surface of resistance 76, for a purpose to be hereinafter described. If this movement continues sufficiently, the contact member 68 engages contact 78, and contact member 70 engages contact 80.

Upon rotation of lever 92, the set screw 100, riding in the groove 96, causes the U-shaped member 98 to move longitudinally of the casing 10. If the rod 40 is then stationary, the switches 106 and 108 are operated to establish a new value of pressure in the chamber 16 corresponding to the new angular position of lever 92.

Instead of the helical contour previously described, the cam 96 may be given any desired contour so as to vary the intake manifold pressure as a particular function of the angular position of arm 92.

Figure 3

There is illustrated in Figure 3 a two-way clutch operating mechanism by which a device to be positioned, in this case the throttle of an internal combustion engine, may be driven either by a manually controlled lever 150 or by a motor 152. In Figure 3, the throttle or other device to be positioned is connected to a shaft 154. The shaft 154 is suitably supported by means not shown, and terminates in a bushing 156 which is fixed on the shaft 154. A disc 158 is keyed on the bushing 156 so that it rotates with the bushing 156 and hence with the shaft 154, but the disc 158 may slide along the bushing 156. A pin 160 extends thru the disc 158 parallel to the shaft 154, and projects from the opposite sides of the disc 158. The manual lever 150 is rotatably mounted on the shaft 154, and is provided with a socket 162 which, when the parts are in the positions shown in the drawing, is engaged by the pin 160.

It may therefore be seen that when the parts are in the position shown, any rotation of lever 150 is transmitted thru pin 160, disc 158, and bushing 156 to the shaft 154.

The disc 158 is provided with a circumferential groove 164 in which ride a pair of pins carried at the ends of the arms of a double lever 166, only one of whose arms is shown in the drawing. A spring 168 is retained in compression between the disc 158 and a frame member 170, and biases the disc 158 toward the position shown in the drawing, wherein the pin 160 engages arm 150.

The lever 166 is pivotally mounted at 172 on a post 174. The end of lever 166 opposite the disc 158 is attached, as by means of a pin and slot connection to a rod 176 connected to the armature 178 of an electromagnet generally indicated at 180. A spring 182 biases the armature 178 to the position shown in the drawing. An electrical winding 184 cooperates with the armature 178 to cause an upward movement of the armature against the action of spring 182 when the winding 184 is energized. Such a movement of armature 178 causes the lever 166 to rotate clockwise about its pivot 172, thereby moving the disc 158 downwardly and compressing the spring 168.

The motor 152 drives a shaft 186 which carries a disc 188 having multiple apertures 190 to receive the pin 160. It will be seen that upon a downward movement of the disc 158 from the position illustrated, the pin 160 will move free of the manual lever 150, and will engage one of the apertures 190 in the disc 188. When the pin 160 and disc 188 are so engaged, rotation of the shaft 186 by the motor 152 will be transmitted thru pin 160, disc 158, and bushing 156 to throttle shaft 154.

If, at the moment the winding 184 is energized, the pin 160 is not in the proper angular position to engage one of the apertures 190 in disc 188, it will ride on the surface of disc 188, and its upper end will remain engaged with arm 150. Then upon rotation of motor 152, disc 188 turns until one of the apertures 190 is aligned with pin 160, whereupon the pin snaps into the aperture. In the unusual case where the motor 152 is not energized simultaneously with winding 184, the pin 160 may be rotated by arm 150 until it is aligned with apertures 190, whereupon the pin will be snapped into position.

Conversely, when the winding 184 is de-energized, the spring 182 will move the armature 178 downwardly and the disc 158 upwardly. If the pin 160 is not then in the proper position to engage the notch 162 the lever 150 may be manually rotated until the pin 160 and notch 162 are aligned.

Figures 4 and 5

There is shown in Figures 4 and 5 a two-speed gear shifting mechanism, by which either of two speed ratios between a driving shaft and a driven gear may be selected. The shaft 200 is the driving shaft, and may be driven by a motor. A drum 202 is freely rotatable on the shaft 200. The drum 202 carries near its periphery a pinion shaft 204. On the inside of the drum 202, the pinion shaft 204 carries a pinion 206, and on the outside of the drum 202, there are fixed on the pinion shaft 204 two gears 208 and 210. The gear 208 mates with another gear 212 which is keyed on the drive shaft 200. The gear 210 mates with another gear 214 which is freely rotatable on the shaft 200, and which is the driven gear of the assembly.

A brake band 216 encircles the drum 202. Within the drum 202 there is mounted a detent bar 218. The bar 218 is recessed at one end to form two fingers 220 and 222, spanning the pinion 206. At the bottom of the recess is a projection 224 which may engage the pinion 206 to prevent the rotation thereof. The bar 218 is slotted to receive the shaft 200, and is also slotted to receive screws 226 which hold it in place on the drum 202. A spring 228 acts on the end of the bar opposite the fingers 220 and 222, being held in compression between that end of the bar and the inside of the drum 202. A projection 230 on the bar holds the spring 228 in place.

It will be seen that when the projection 224 is engaging the pinion 206, the fingers 220 and 222 project thru apertures in the drum 202. When the band 216 is tightened on the drum 202, it engages the ends of fingers 220 and 222 and moves the bar 218 upwardly, thereby releasing the projection 224 from the pinion 206.

One end of the band 216 is fixed, as at 232. The other end of band 216 is attached to the armature 234 of an electromagnet generally indicated at 236. The electromagnet is provided with a winding 238. The armature 234 is biased by a spring 240 toward a position wherein the band 216 engages the drum 202. Upon energization of winding 238, the armature 234 is moved to the position shown in the drawing, wherein the band 216 is free of the drum 202.

When the parts are in the positions shown in the drawing, the pinion 206 is held against rotation by the projection 224, and the drum 202 is free to rotate. Since the pinion shaft 204 cannot then rotate about its own axis, rotation of shaft 200 causes gears 212, 208, 204 and 214 to rotate together as a unit. When the brake band 216 is tightened, however, the pinion 206 is released by the projection 224, as previously described. Rotation of shaft 200 then causes gear 212 to rotate gear 208 and the pinion shaft 204 thereby rotating gear 210 and thru it, gear 214. The speed of gear 214 is then much lower than the speed of shaft 200, the gear ratio being determined by the relative numbers of teeth on the gears 212 and 208 and on the gears 210 and 214.

Figure 6

There is illustrated in Figure 6 another arrangement for securing a two-speed gear reduction. In this arrangement, a motor in a casing 250 drives a pinion 252, which mates with a gear 253 on a sleeve 254 which surrounds an arbor 256 attached to the casing 250.

A drum 258 is rotatably supported on the sleeve 254 by a needle bearing 260. The right end of sleeve 254 is provided with a worm 262 having a relatively large helix angle. The worm 262 cooperates with a worm wheel 264 attached to a shaft 266 which extends across the drum 258 as a chord. The shaft 266 carries a bevel gear 268 which cooperates with another bevel gear 270 fixed on a pinion shaft 272 mounted in an end wall of the drum 258 near its periphery. The shaft 272 also carries a pinion 274 which cooperates with a gear 276 carried by a sleeve 278 rotatably mounted on the arbor 256. The sleeve 278 also carries another gear 280, which is the driven gear of the assembly.

A brake band 282 encircles the drum 258, and may be operated by suitable mechanism, not shown, similar to that which operates the brake band 216 of Figure 5. When the drum 258 is free to rotate, the helix angle of the worm 262 is sufficiently large that as the worm rotates, there is no cooperating rotation of the worm gear 264 about its own axis, but instead the worm gear 264 acts as a lever arm to transmit a rotating torque to the drum 258. The drum 258 then rotates at the same speed as worm 262, and carries with it the gear 276, sleeve 278 and the driven gear 280.

When the brake band 282 is tightened, the drum 258 is locked against rotation. Rotation of worm 262 at that time causes worm gear 264 to rotate about its own axis, driving the shaft 266 thru the bevel gears 268 and 270, pinion gear 274, gear 276, sleeve 278 and gear 280. The ratio between the speed of worm 262 and the gear 280 is then much greater than in the previous case, being determined by the gear ratio between the worm 262 and the worm gear 264, and also by the ratio between pinion 274 and gear 276.

Figure 7

There is shown in Figure 7 an air induction system for an aircraft engine, thru which air flows from an intake scoop 300 thru a first supercharger 302 discharging into a conduit 303, a venturi 304, past a throttle 305, and a fuel discharge nozzle 306, and thru a conduit 308 and a second supercharger 310 to a conduit 312 connected to the intake manifold 313 of an internal combustion engine 348.

The supercharger 302 includes a rotor 314 driven by a turbine 316 powered by the exhaust gases of the engine. The exhaust gases are conveyed from the engine to the turbine thru a conduit 318. A portion of the exhaust gases entering the conduit 318 at the engine is by-passed thru a conduit 320 controlled by a valve 322, commonly termed a waste gate. The waste gate 322 is driven by an electrical motor generally indicated at 324 thru a two-speed gear shift 326 which may be of one of the types described in connection with either Figures 4 and 5 or Figure 6. The motor 324 is illustrated as being of the direct current series wound type, and is provided with an armature 328 and a pair of field windings 330 and 332. The motor 324 rotates in a direction dependent upon whether the winding 330 or the winding 332 is energized.

The throttle 305 may be driven by motor 334 thru a gear shift 336 and a two-way clutch 338. As in the case of gear shift 326, the gear shift 336 may be one of the two types illustrated in Figures 4 and 5 and in Figure 6. The clutch 338 may be of the construction illustrated in Figure 3, and is selectively operable to permit operation of the throttle 305 either by the motor 334 or by manipulation of a manual lever 340 which corresponds to lever 150 in Figure 3. Motor 334 is also of the direct current series wound type and is provided with an armature 342 and a pair of field windings 344 and 346 whose selective energization determines its direction of rotation.

The supercharger 310 is driven directly by the engine, schematically illustrated at 348, thru a gear shift mechanism 350. The gear shift mechanism 350 may be of any suitable type and is provided with a lever 352, which is pivoted at its center and is shiftable from the position shown in the drawing, wherein the supercharger speed is low, to a position displaced clockwise from that shown in the drawing, wherein the supercharger speed is high. The upper end of lever 352 is attached to an armature 354 of an electromagetic motor mechanism which also includes two electromagnetic windings 356 and 358. When the winding 356 is energized, armature 354 is moved to the position illustrated, and the supercharger speed is low. When the winding 358 is energized, armature 354 is moved to the right, and the gear shifting mechanism 350 is operated so that the supercharger 310 runs at high speed.

The motor 324 which drives the waste gate 322, the motor 334 which drives the throttle 305, and the electromagnetic motor mechanism which operates the gear shifting mechanism 350 are controlled by a device responsive to intake manifold pressure and schematically indicated at 360, acting thru a relay mechanism generally indicated at 362.

The control device 360 may be the same as that illustrated in detail in Figure 1. The various elements in the control device 360 have reference numerals which are the same as the numerals of corresponding elements of Figure 1. It may be seen that the device 360 includes two single-pole, double-throw switches 106 and 108, a contact 68 movable along a resistance element 76 and engageable with a contact 78, and a contact 70 movable into engagement with a contact 80. The switch 106 includes a contact arm 118 which may engage either of a pair of stationary contacts 124 and 126 and the switch 108 includes a movable contact arm 361 which may engage either of a pair of stationary contacts 364 and 366.

The relay mechanism 362 includes a pair of relays 368 and 370 and a time delay relay 372. The relay 368 includes a winding 374 which operates an armature 376. A movable contact 378 is operated by armature 376 and cooperates with a pair of stationary front contacts 380 and 382. Another contact 384, operated by armature 376, cooperates with a pair of stationary back contacts 386 and 388. The armature 376 is provided with an extension 390 which cooperates with a lever 392 forming a part of a single-pole, double-throw switch mechanism. The lever 392 carries at its end a contact 394 which cooperates with a stationary contact 396 electrically connected to contact 388. Adjacent its end, the lever 392 carries an armature 398 which cooperates with a stationary permanent magnet 400.

The relay 370 includes a winding 402 which moves an armature 404. Movable contact 406 operated by armature 404 cooperates with a pair of stationary front contacts 408 and 410. Another movable contact 412 operated by armature 404 cooperates with a pair of stationary back contacts 414 and 416. The armature 404 has an extension 418 which is adapted to cooperate with the end of lever 392 opposite that end which cooperates with extension 390 on armature 376 of relay 368. This end of lever 392 carries a contact 420 which cooperates with a stationary contact 422. Adjacent this end of lever 392 is an armature 424 which cooperates with a stationary permanent magnet 426. The lever 392 is fulcrumed substantially at its center as indicated at 428.

Relay 372 includes a winding 430 which operates an armature 432 carrying a switch operator 434. Suitable time delay means are also provided in connection with armature 432 to delay its movement. Such time delay means may conveniently be either a large mass balanced by springs, or a dash pot. As shown in Figure 13, it consists of a heavy arm 433, pivoted at 435 and biased by a spring 437 to engage a stop 439. When arm 433 engages stop 439, a portion of the arm lies in the path of armature 432. Upon downward movement of armature 432 by its associated spring 431, the arm 433 must be moved to extend the spring 437 before the armature 432 reaches the end of its travel. The movement of armature 432 is therefore delayed by the time required for spring 431 to overcome the inertia of arm 433 and the spring 437. After the arm 433 has been moved to the position shown in Figure 13, where it no longer blocks the armature 432, it is still held in frictional engagement therewith by spring 437, further delaying movement of armature 432. On its return upward movement, only the frictional engagement delays movement of armature 432. However, as hereinafter explained, only the time delay on the downward movement of armature 432 is important in the present application. That time delay may be adjusted by varying the characteristics of springs 431 and 437, or by adding mass in the form of one or more nuts 441 to the end of arm 433. The switch operator 434 lies between a pair of switch fingers 436 and 438, which are biased toward each other by a spring 440 so that the finger 436 tends to engage a stationary contact 442, and the finger 438 tends to engage a stationary contact 444. The operator 434 is just slightly smaller than the distance between fingers 436 and 438 when both are engaging their respective contacts, and is arranged to move contact 436 away from contact 442 when winding 430 is deenergized, and to move finger 438 away from contact 444 when winding 430 is energized. The two switches which include the finger 436 and contact 442 and the finger 438 and contact 444 are connected in a series circuit. It may be seen, that because of the construction of this relay, this circuit is completed thru these contacts for a short interval of time upon energization or de-energization of winding 430, and that as long as winding 430 remains in a state of constant energization or de-energization, this circuit is not completed.

A pair of limit switches 446 and 448 are mounted so as to be operated by an arm 450 which is connected to and moves in synchronism with the waste gate 322. The limit switch 446 includes a finger 452 biased into engagement with a contact 454 by a spring 456. When the end of arm 450 engages finger 452, it is moved thereby into engagement with another stationary contact 458. The limit switch 448 includes a switch finger 460 biased into engagement with a contact 462 by spring 464 and movable into engagement with contact 466 upon engagement of its extremity by the switch arm 450.

Another pair of limit switches, generally indicated at 468 and 470, are arranged for operation by an arm 472 moving in synchronism with the throttle 305. The limit switch 468 includes a finger 474 biased into engagement with a stationary contact 476 by means of a spring 478 and movable into engagement with a contact 480 upon engagement of its extremity by the arm 472, which occurs when the throttle 305 moves to its closed position. The limit switch 470 includes a finger 482 biased into engagement with a contact 484 by a spring 486 and movable into engagement with a contact 488 upon engagement of its extremity by the arm 472, which occurs when the throttle 305 is moved to full open position.

The arm 472 carries at its lower end a contact 490 which rides on an elongated stationary arcuate contact 492. The contact 492 is so constructed that the contact 490 engages it whenever the throttle 305 is within a range of positions extending from its fully closed position to a point where the throttle is somewhat more than half open.

A pair of limit switches 494 and 496 are associated with the gear shift mechanism 350 so as to be operated by the lower end of the arm 352. The limit switch 494 includes a finger 498 biased against a stop, and movable into engagement with a contact 500 upon movement of the arm 352 from its low speed position to its high speed position. The limit switch 496 includes a finger 502 biased for engagement with a contact 504 and movable into engagement with another contact 506 upon movement of lever 352 to its low speed position.

A time delay relay 508 is associated with the gear shift mechanism 350, for a purpose to be hereinafter described. The relay 508 includes a winding 510 and controls the movements of a switch arm 512 with respect to a stationary contact 514.

A circuit breaker generally indicated at 516 is provided to shut down the system in case of an overload. The circuit breaker 516 includes a bridging contact 518 which normally bridges a pair of contacts 520 and 522, and is controlled by a bimetallic thermostat 524. A heater winding 526 is associated with the bi-metallic element 524. The circuit breaker 516 also includes a pair of stationary contacts 528 and 530, which are bridged by the contact 518 when the latter is tripped from its normal position.

A governor 532 driven by the shaft of the engine 348 operates a switch finger 534 between the stationary contacts 536 and 538. Alternatively, the finger 534 may be positioned by the propeller R. P. M. governor control.

An electrical signal lamp is indicated at 540. The system is controlled by a master switch 542, and is supplied with electrical energy by a battery 454.

*Operation of Figure 7*

When the parts are in the position shown in the drawing, the system is de-energized, and the throttle 305 may be positioned by manipulation of the lever 340. If it is then desired to place the system in operation, the master switch 542 is closed. This completes an energizing circuit for the clutch 338, thereby placing the throttle 305 under control of the motor 334, as described in detail in connection with Figure 3. This energizing circuit may be traced from the upper terminal of battery 544 thru switch 542, a conductor 546, switch finger 534, contact 536, a conductor 548, heater 526, contact 522, bridging contact 518, contact 520, a conductor 552, clutch 338, and ground connections 554 and 556 to the lower terminal of battery 544.

When the intake manifold pressure is at the value determined by the setting of lever 92 (Figure 1), the switches 106 and 108 are in the positions indicated in Figure 7. Starting with the throttle 305, the gear shifting mechanism 350, and the waste gate 322 also in the positions shown in the drawing, let it be assumed that the intake manifold pressure then decreases below the value which the device 360 has been set to maintain.

Referring for the moment to Figure 1, it may be seen that a decrease in the intake manifold pressure causes an expansion of bellows 32, thereby moving rod 40 to the left, and causing switch 106 to be operated from the position illustrated in Figures 2 and 7 to a position wherein the finger 118 engages contact 124. This completes an energizing circuit for winding 402 of relay 370, which may be traced from the upper terminal of battery 544 thru switch 542, conductor 546, switch finger 534, contact 536, conductor 548, circuit breaker 516, a conductor 550, contact 124, switch finger 118, a conductor 556, switch finger 361, contact 364, a conductor 558, winding 402, and ground connections 562 and 556' to the lower terminal of battery 544.

Energization of winding 402 of relay 370 causes contact 406 to move into engagement with contacts 408 and 410, thereby completing a pressure increasing circuit which may energize, for operation in a pressure increasing sense, either the throttle motor 334, the motor mechanism associated with gear shifting mechanism 350, or waste gate motor 324, depending upon the position of the limit switches 470, 496 and 448. When these limit switches are in the positions illustrated this circuit includes winding 344 and armature 342 of motor 334. This circuit may be traced from the upper terminal of battery 544 thru switch 542, conductor 546, switch finger 534, contact 536, conductor 548, circuit breaker 516, conductor 550, resistance 76, contact 68, conductors 564 and 574, contacts 408, 406 and 410, a conductor 576, switch finger 482 of limit switch 470, contact 484, a conductor 578, winding 344, armature 342 and ground connections 572 and 556 to the lower terminal of battery 544.

Energization of winding 344 and armature 342 causes motor 334 to drive throttle 305 in an opening direction. This movement of throttle 305 causes an increase in the intake manifold pressure. As soon as the intake manifold pressure is restored to the value determined by the setting of lever 92 in Figure 1, the switch 118 is restored to the position illustrated in Figure 7, whereupon the energizing circuit for winding 344 is opened and the motion of the throttle stops. For the purposes of this illustration, however, let it be assumed that the intake manifold pressure remains below the value selected by the setting of lever 92, regardless of the opening movement of the throttle. Such a condition might occur in case the aircraft was continuously climbing. Then the switch finger 118 remains in engagement with contact 124 and the winding 344 of motor 334 continues to be energized until the throttle 305 reaches its full open position, at which time the arm 472 engages switch finger 482 of limit switch 470 and moves it out of engagement with contact 484 and into engagement with contact 488.

This operation of limit switch 470 transfers the pressure increasing circuit from control of the throttle motor 334 to control of the motor mechanism associated with the gear shifting mechanism 350. The throttle opening circuit previously traced is opened by the separation of finger 482 from contact 484. In the place of the throttle opening circuit, the engagement of finger 482 with contact 488 establishes a circuit for operating the gear shifting mechanism 350 to increase the speed of the supercharger 310. This circuit may be traced along the pressure increasing circuit as previously traced to the switch finger 482 and thence thru contact 488, a conductor 580, switch finger 502 of limit switch 496, contact 506, a conductor 582, contacts 514 and 512, a conductor 584, winding 358 and ground connections 586 and 556 to the lower terminal of battery 544. This circuit is not immediately completed because the contacts 512 and 514 are separated. Therefore the intake manifold pressure continues to decrease without any corrective effect being produced by the system, until the difference between the actual manifold pressure and the value selected by the setting of lever 92 is enough to cause contact 78 of the control device 360 to move into engagement with contact 80. When this occurs, an energizing circuit is completed for winding 510 of the time delay relay 508. This circuit may be traced from the upper terminal of battery 544 along the same path as the circuits previously traced to the conductor 550 and thence thru a conductor 588, contacts 70 and 80, a conductor 590, a conductor 592, winding 510, to ground and thru ground connection 556 to the lower terminal of battery 544. As soon as the difference between the actual manifold pressure and the selected manifold pressure has caused the contacts 70 and 80 to remain in engagement for a period of time sufficient to cause relay 508 to engage contacts 512 and 514, the energizing circuit for winding 358 is completed. The armature 354 is thereupon moved to its right hand position, operating the lever 352 to increase the speed of the supercharger 310.

The sudden increase in supercharger speed produces a sudden increase in the intake manifold pressure, to which the control device 360 responds by moving switch fingers 118 and 361 into engagement with contacts 126 and 366, respectively, thereby opening the previously completed energizing circuit for relay 370 and closing a circuit for energizing winding 374 of relay 368. This circuit may be traced from the upper terminal of battery 544 along the same path as the previously traced circuits to the conductor 550, and thence thru conductor 594, contact 366, switch finger 361, conductor 556, switch finger 118, contact 126, conductor 596, winding 374, conductor 560 and ground connections 562 and 556 to the lower terminal of battery 544.

Energization of winding 374 of relay 368 causes contact 378 to bridge the stationary contacts 380 and 382, thereby completing a pressure decreasing circuit, which may energize, for operation in a pressure decreasing sense, either the throttle motor 334, the motor mechanism associated with the gear shifting mechanism 350, or waste gate motor 324, depending upon the position of the limit switches 446, 468 and 494. When these limit switches are in the positions illustrated, this circuit includes field winding 346 and armature 342 of motor 334, whose energization causes the motor to drive the throttle in a closing direction.

This circuit may be traced from the upper terminal of battery 544 thru switch 542, conductor 546, switch finger 534, contact 536, conductor 548, circuit breaker 516, conductor 550, resistance 76, contact 68, conductor 564, contacts 382, 378, and 380, a conductor 566, switch finger 452 of limit switch 446, contact 458, a conductor 568, switch finger 474 of limit switch 468, contact 476, a conductor 570, winding 346, armature 342, and ground connections 572 and 556 to the lower terminal of battery 544.

The closing movement of the throttle continues only so long as necessary to reduce the excessive increase in manifold pressure caused by the operation of the gear shifting mechanism 350 from low to high speed. As soon as the intake manifold pressure is restored to its selected value, the throttle closing circuit is opened.

If the intake manifold pressure again decreases below the selected value, the throttle opening circuit previously traced is again completed. The opening movement of the throttle continues until it reaches full open position whereupon the arm 472 again actuates finger 482 of limit switch 470 to open the throttle opening circuit and to move the finger 482 into engagement with contact 488. This operation of limit switch 470 transfers the pressure increasing circuit from control of the throttle opening circuit to control of the waste gate closing circuit, since the finger 502 of limit switch 496 is now in engagement with contact 504, as a result of the gear shifting mechanism 350 being in its high speed position.

The waste gate closing circuit may be traced along the throttle opening circuit previously described to the switch finger 482 and thence thru contact 488, conductor 580, switch finger 502, contact 504, a conductor 598, switch finger 460 of limit switch 448, contact 462, a conductor 600, field winding 332, armature 328 and ground connections 602 and 556 to the lower terminal of battery 544.

Energization of field winding 332 and armature 328 causes operation of waste gate 322 in a closing direction, thereby directing a greater proportion of the exhaust gases thru the turbine 316 and increasing the speed of the supercharger 314, thereby further increasing the manifold pressure.

If the manifold pressure still remains below the selected value, the closing movement of the waste gate continues until it is fully closed whereupon the switch finger 460 of limit switch 448 is engaged by arm 450 and moved away from contact 462 and into engagement with contact 466.

This operation of limit switch 448 opens the waste gate closing circuit and closes a circuit to open the waste gate and to operate a signal. This signal circuit may be traced along the waste gate closing circuit previously set forth to the finger 460 and thence thru contact 466, a conductor 604, a relay winding 606, a conductor 608, and a conductor 610 to signal 540, and thence thru ground connections 612 and 556 to the lower terminal of battery 544. The energization of signal 540 indicates to the pilot or some other member of the aircraft crew that the system is not capable of maintaining the selected manifold pressure any longer.

At the same time, energization of relay winding 606 causes switch contact 614 to engage switch contact 616 thereby completing an energizing circuit for winding 330 and armature 328 of waste gate motor 324, so as to cause an operation of that motor in a waste gate opening direction. This circuit may be traced along the last described circuit to the relay winding 606, and thence thru contacts 614 and 616, a conductor 618, switch finger 452 of limit switch 446, contact 454, a conductor 620, field winding 330, armature 328 and ground connections 602 and 556 to the lower terminal of battery 544. This initiates an opening movement of the waste gate which continues only until switch finger 460 leaves contact 466 and engages contact 462, whereupon the waste gate closing circuit is again established.

It may therefore be seen that when the waste gate reaches its fully closed position, and the intake manifold pressure remains below the selected value, the waste gate is caused to oscillate about its closed position, and the signal 540 is caused to flash on and off.

Under these conditions, that is, with the waste gate fully closed, the throttle fully opened, and the gear shifting mechanism at high speed position, let it be assumed that the intake manifold pressure now increases above the value which the device 360 was set to maintain. Referring to Figure 1, it may be seen that an increase in the intake manifold pressure causes a collapse of bellows 32 thereby moving rod 40 to the right and operating switch finger 361 from a position shown in Figure 7 into engagement with contact 366. This completes the energizing circuit for winding 374 of relay 368, which was previously traced. Energization of winding 374 causes contact 378 to bridge the contacts 380 and 382, thereby completing the pressure decreasing circuit, also previously traced, which because of the position of limit switch 446 now controls the field winding 330 and armature 328 of waste gate motor 324.

This circuit may be traced from the upper terminal of battery 544 thru switch 542, conductor 546, switch finger 534, contact 536, conductor 548, circuit breaker 516, conductor 550, resistance 76, contact 68, conductor 564, contacts 382, 378 and 380, conductor 566, switch finger 452 of limit switch 446, contact 454, conductor 620, field winding 330 and armature 328, and ground connections 602 and 556 to the lower terminal of battery 544.

If this circuit remains energized until the waste gate is fully opened, the arm 450 engages switch finger 452 and moves it to the position shown in the drawing, thereby transferring the pressure decreasing circuit from control of the waste gate motor 324 to control of the throttle motor 334 and the gear shifting mechanism 350.

The first effect of this transfer is to start the throttle motor running in a throttle closing direction, thru the throttle closing circuit previously traced. As soon as the throttle reaches a position wherein the contact 490 on arm 472 engages the arcuate contact 492, the gear shifting mechanism 350 is shifted to low speed position.

The energizing circuit for operating the gear shifting mechanism 350 in this manner may be traced along the pressure decreasing circuit previously described, to the switch finger 452 and thence thru contact 458, conductor 568, a conductor 622, limit switch 494, a conductor 624, contacts 490 and 492, a conductor 626, winding 356 and ground connections 586 and 556 to the lower terminal of battery 544. Energization of winding 356 causes armature 328 to move to its low speed position as illustrated in the drawing, and the circuit last traced is then broken by limit switch 494.

The pressure decreasing circuit is then in control of the throttle motor 334, thru the throttle closing circuit previously described. If the throttle continues to move in a closing direction until it is fully closed, then the arm 472 engages switch finger 474, opening the throttle closing circuit and moving finger 474 into engagement with contact 480. This completes a circuit for continuously energizing the signal 540. This circuit may be traced along the pressure decreasing circuit previously described to the switch finger 474 and then thru contact 480, a conductor 628, conductors 608 and 610, signal 540, and then thru ground connections 612 and 556 to the lower terminal of battery 544.

Since this operation (complete throttle closure) never occurs under normal conditions, the movement of the throttle to full closed position will indicate that the system is not maintaining the selected manifold pressure, which will be communicated to the pilot by the signal 540.

There is graphically illustrated in Figure 8 the sequence of operation of the throttle, the supercharger gear ratio and the turbine waste gate as described above. There is also illustrated the effect of the operation of these devices on the intake manifold pressure, the indicated horse power and the brake horse power.

In Figure 8, the abscissae represent altitudes above sea level. Three of the graphs illustrate the respective positions of the throttle, the supercharger gear ratio control and the turbine waste gate as the altitude increases and the positions of these devices are varied in order to maintain a substantially constant manifold pressure. The uppermost graph in Figure 8 illustrates the variation of manifold pressure, while the two lowest graphs show brake horse power and indicated horse power, respectively. In all these curves, it is assumed that the speed of the engine remains constant.

It may be noted that the manifold pressure is maintained constant except for a short interval just before the supercharger gear ratio is changed from low to high speed. It would be possible to operate the gear shift so as to maintain a constant manifold pressure under these conditions. If a constant manifold pressure were maintained, however, a sudden variation in the brake horse power would be experienced at the time the gear shift was operated. It has been found more desirable to allow the manifold pressure to drop until the brake horse power assumes a value substantially equivalent to that at a point on the characteristic curve of variation of brake horse power with altitude when the gear ratio is high, and then to shift from low to high speed, so that there is no sudden change in the brake horse power output of the engine. This is accomplished by the contacts 70 and 80 in Figure 7 which control the transfer of the gear shifting mechanism 350 from low speed to high speed position, so as to prevent any shift from low speed to high speed until the manifold pressure departs from the selected value by a predetermined amount. The time delay relay 508 is also effective to delay this shift until the manifold pressure has departed from its selected value by a predetermined amount and for a predetermined time. A time delay relay 509 may also be added to the circuit which energizes winding 354, if desirable, as illustrated in Figure 12.

Whenever either of the relays 368 and 370 is energized, the winding 430 of relay 372 is also energized thru a parallel circuit extending from conductor 556 (which connects switch fingers 118 and 361 in the control device 360) thru a conductor 639, winding 430 and conductor 560 to ground at 562. As previously explained, the switches 438—444 and 436—442 are both closed only during the movement of armature 432 between its de-energized and energized positions. When the armature is moving from its de-energized to its energized position, no circuit is completed thru these contacts even though they are closed, since they are connected in series with conductor 632 and lever 392 and both the circuits which extend thru lever 392 are then opened, either at contacts 384 and 422, if relay 368 is energized or at contacts 412 and 396 if relay 370 is energized. For example, assume that the relay winding 430 is energized simultaneously with winding 374 of relay 368, the energization of winding 374 causes extension 390 of armature 376 to move lever 392 clockwise about its pivot 428 to the position shown in the drawing, if it is not already in that position. By the clockwise movement of lever 392, the circuit thru contact 420 is broken by the separation of contact 420 from contact 422. At the same time, the circuit thru contact 394 of lever 392 is opened by the separation of contact 384 from contact 388.

Upon de-energization of relay 370, however, relay winding 430 is simultaneously de-energized and a circuit is momentarily completed which tends to drive the motor being controlled by the system in a direction opposite to that caused by the energization of relay winding 374, as the lever 392 is not moved upon de-energization of either relay 368 or relay 370. Upon de-energization of either of the relays 368 and 370 the permanent magnet 400 or 426 holds the lever 392 in the position it had during the last energization of one of the relays.

For example, as previously described, energization of relay winding 374 causes the establishment of a circuit thru winding 346 and armature 342, so that motor 334 drives the throttle in a closing direction. When the movement of the throttle has proceeded far enough to restore the intake manifold pressure to its selected value, the relay windings 374 and 430 are de-energized. A circuit is thereby completed which is momentarily effective to energize winding 344 of motor 334, which tends to cause an opening movement of the throttle. This circuit, which may be termed the braking circuit, may be traced from the upper terminal of battery 544, thru switch 542, conductor 546, switch finger 534, contact 536, conductor 548, circuit breaker 516, conductor 550, resistance 76, contact 68, conductor 564, conductor 574, a variable resistance 634, finger 438, contacts 444 and 442, switch finger 436, conductor 632, lever 392, contacts 394, 396, 388, 384 and 386, a conductor 636, conductor 576, switch finger 482, contact 484, conductor 578, field winding 344, armature 342, and ground connections 572 and 556 to the lower terminal of battery 544.

The momentary completion of this circuit causes the motor to be energized for operation in a direction opposite to that in which it has just been running. By properly designing the time delay characteristics of relay 372, the length of the period of energization of this braking circuit may be made just sufficient to stop the motor completely and prevent it from running under the influence of its own inertia. The throttle is therefore prevented from overrunning and setting up a "hunting" condition. If desired, the relay 372 may be so designed that the motor reverses a few revolutions and may even be made to attain substantially the exact position it had at the moment its circuit was interrupted. The braking action may be additionally controlled by manipulation of the variable resistance 634.

It may be seen that a similar circuit is set up for energizing the throttle closing field winding of the motor 334 momentarily upon de-energization of the throttle opening winding. Furthermore, it may be seen that these braking circuits are not effective only in connection with the throttle, but are effective on the waste gate when the latter is being controlled by this system.

As a further aid to prevent "hunting" conditions, I have provided means for varying the speed of the motor driving the throttle and waste gate in accordance with the difference between the existing manifold pressure and the pressure selected by the operation of lever 92. This means includes the resistance 76 and the contact 68. Referring to Figure 1, it may be seen that as the actual intake manifold pressure varies from the selected value in either sense, the sleeve 60 is telescoped further within the sleeve 62, so that the contact 68 is moved farther to the left along resistance 76. Since the resistance 76 and contact 68 are connected in series in the various motor energizing circuits, it may be seen that the movement of contact 68 to the left along resistance 76 decreases the amount of resistance in these circuits and thereby increases the speed of the motor being controlled. Conversely, as the actual manifold pressure approaches the selected value, the motor is gradually slowed down.

Furthermore, as the difference between the selected intake manifold pressure and the actual pressure increases, the contact 70 moves to the left and finally engages contact 80, whereupon an energizing circuit is completed for the gear shifting devices 326 and 336. This circuit may be traced from the upper terminal of battery 544 thru switch 542, conductor 546, switch finger 534, contact 536, conductor 548, circuit breaker 516, conductor 550, conductor 598, contact 70, contact 80, conductor 599, a conductor 638 and thence either thru a conductor 640, gear shift 326 and a ground connection 642 or thru a conductor 644, gear shift 336 and a ground connection 646 to ground connection 556 and the lower terminal of battery 544. Energization of either of these devices causes the throttle or the waste gate, as the case may be, to be operated at a higher speed so as to restore the pressure more quickly to its selected value.

Altho the gear shifting mechanisms 326 and 336, associated with the waste gate and throttle motors, are illustrated in Figure 7 as being controlled by the same pair of contacts 70 and 80, which control the gear shifting mechanism 359 between the engine 348 and the supercharger 310, it should be apparent that separate sets of contacts such as contacts 71 and 81 of Figure 11, may be provided to perform these functions independently in case that mode of operation is found desirable.

In most types of internal combustion engines, the intake manifold pressure decreases with an increase in engine speed, presuming the throttle position and other factors in the air induction system to be constant. Furthermore, the manifold pressure usually increases as the throttle is moved toward open position. In some aircraft engines, however, a phenomenon known as "boost reversal" takes place at engine speeds of less than, for example, 900 revolutions per minute. By the term "boost reversal" is meant that the intake manifold pressure increases as the throttle moves toward closed position. The reason for this phenomenon is that the engine intake valves are set to open before the engine has completed its exhaust stroke. When the engine is running fast, the inertia of the gases in the cylinder and the manifolds is sufficient to prevent any exhaust gas from passing out thru the intake valve when it first opens. At low speeds, however, some of the burned gases in the engine cylinder pass out thru the intake valve and into the intake manifold, causing an increase in the pressure therein.

When an automatic intake manifold pressure control system such as that disclosed herein is used in connection with an engine in which the "boost reversal" phenomenon is present, it may be seen that when the engine speed is below the critical value, an attempt by the control system to reduce the manifold pressure by moving the throttle toward closed position would result in an increased manifold pressure and consequently the throttle would continuously move until it was completely closed. Under those circumstances, it would be impossible to idle the engine at any speed less than the critical speed, which usually occurs about 900 R. P. M.

Therefore I have provided in my system the governor 532 which responds to the engine speed so that when the speed decreases below 900 R. P. M., the switch finger 534 is moved away from contact 536, thereby de-energizing the entire automatic control system. At the same time, the switch finger 534 is moved into engagement with the contact 538 to energize the signal light 540, indicating the presence of a dangerous condition.

It will be readily understood that the switch finger 534 and the contacts 536 and 538, as illustrated in Figure 7, are merely schematic, and that in any practical system, snap switches or other suitable mechanism would be employed so that there would be no lag between the shutting down of the system and the energization of signal 540.

Reviewing the operation of signal 540, it will be seen that this gives a flashing signal whenever the waste gate is moved by the system to its fully closed position, and that it gives a steady signal whenever the throttle is fully closed or when the engine speed drops below 900 R. P. M.

The operator of the aircraft should understand that when the flashing signal is given the operator should decrease the setting of the lever 92. On the other hand when the steady signal is given the operator should open the switch 542 to cut out the signal and take over control of the throttle manually by means of the lever 340. The lever 340 (Figure 7) may be linked to the lever 92 (Figure 1) so that the two will move concurrently. Then the lever 340 may be used in automatic operation to set intake manifold pressure and during manual operation to set the throttle position.

The control system described herein may alternatively be arranged to maintain the quantity of air entering the carburetor constant, instead of maintaining the intake manifold pressure constant, as previously described. Such an arrangement is shown in Figure 14. In order to obtain this effect, the interior of bellows 33, which corresponds to bellows 32 of Figure 1, is connected to the throat of venturi 304 by a conduit 307, and the chamber 17, corresponding to chamber 16 of Figure 1, is connected by means of a conduit 309 to the conduit 303 at a point spaced from venturi 304. Other changes in the bellows 32 and its spring 54 might also be necessary.

While I have shown and described certain preferred embodiments of my invention, other modifications will readily occur to those skilled in the art, and I therefore intend my invention to be limited only by the appended claims.

I claim as my invention:

1. Apparatus for controlling the throttle of an internal combustion engine, comprising motor means for driving said throttle, a flexible bellows, means subjecting said bellows to the pressure in the intake manifold of said engine so that said bellows expands and contracts in accordance with said pressure, means responsive to movement of one end of said bellows from a predetermined position for controlling said motor means, means for supporting the other end of said bellows, and means for positioning said supporting means in accordance with the rate of change of said intake manifold pressure.

2. Apparatus for controlling the pressure in the intake manifold of an internal combustion engine, comprising means for varying said pressure, reversible motor means for driving said pressure varying means, a control element, means for positioning said element in accordance with said pressure, means responsive to the direction of displacement of said element from a predetermined position for controlling the direction of operation of said motor means to move said pressure varying means to restore said pressure to a value corresponding to said predetermined position of said element, and means responsive to the magnitude of the displacement of said element from said position for controlling the speed of said motor means.

3. Apparatus for controlling the pressure in the intake manifold of an internal combustion engine, comprising means for varying said pressure, reversible motor means for driving said pressure varying means, a control element, means for positioning said element in accordance with the resultant of said pressure and the rate of change of said pressure, means responsive to the direction of displacement of said element from a predetermined position for controlling the direction of operation of said motor means to move

21 said pressure varying means to restore said pressure to a value corresponding to said predetermined position of said element, and means responsive to the magnitude of the displacement of said element from said position for controlling the speed of said motor means.

4. Apparatus for controlling the pressure in the intake manifold of an internal combustion engine, comprising means for varying said pressure, reversible electrical motor means for driving said pressure varying means, a control element, means for positioning said element in accordance with said pressure, means responsive to the displacement of said element from a predetermined position for controlling the operation of said motor means to move said pressure varying means to restore said pressure to a value corresponding to said predetermined position of said element, and means responsive to the restoration of said element to said position for dynamically braking said motor means to suddenly stop its movement.

5. Apparatus for controlling the pressure in the intake manifold of an internal combustion engine, comprising means for varying said pressure, reversible electrical motor means for driving said pressure varying means, a control element, means for positioning said element in accordance with the resultant of said pressure and the rate of change of said pressure, means responsive to the direction of displacement of said element from a predetermined positioning for controlling the direction of operation of said motor means to move said pressure varying means to restore said pressure to a value corresponding to said predetermined position of said element, means responsive to the magnitude of the displacement of said element from said position for controlling the speed of said motor means, and means responsive to the restoration of said element to said position for dynamically braking said motor means to suddenly stop its movement.

6. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold, means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said element, first limit switch means responsive to the position of said throttle, second limit switch means responsive to the position of said gear ratio varying means, third limit switch means responsive to the position of said waste gate, and control transfer means including said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened

22 wide and finally the waste gate is closed, while if said pressure increases above said value when the waste gate is closed, the gear ratio varying means is in high speed position and the throttle is open, first the waste gear gate is opened, then the throttle is partly closed, then the gear ratio varying means is shifted to low speed position and the throttle again opened and finally the throttle is closed.

7. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold; means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said element, limit switch means associated with each of said motor means, first control switch means for closing a circuit whenever said pressure differs from a predetermined value by a predetermined amount for a predetermined time, second control switch means for closing a circuit whenever said throttle is in a range of positions adjacent its closed position, and control transfer means including both said control switch means and said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and then the waste gate is closed, while if said pressure increases above said value when the waste gate is closed, the gear ratio varying means is in high speed position and the throttle is open, first the waste gate is opened, then the throttle is partly closed, then the gear ratio varying means is shifted to low speed position and the throttle again opened and finally the throttle is closed.

8. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold; means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said element, limit switch means associated with each of said motor means, and control transfer means including said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and finally the waste gate is closed, while if said pressure increases above said value when the waste gate is closed, the gear ratio varying means is in high speed position and the throttle is open, first the waste gate is opened, then the throttle is partly closed, then the gear ratio varying means is shifted to low speed position and the throttle again opened, and finally the throttle is closed, said limit switch means including a switch movable to circuit closing position as an incident to closure of said waste gate, said last-named switch being effective when closed to operate said control means to cause movement of said waste gate in an opening direction.

9. In an internal combustion engine having an air induction system including a supercharger driven by a turbine powered by the exhaust gases from said engine and controlled by a waste gate, and an intake manifold; means for controlling the pressure in said intake manifold, comprising the combination of motor means for operating said waste gate, a control element, means for positioning said element in accordance with said pressure, motor control means responsive to the position of said element, limit switch means including a switch movable to circuit closing position as an incident to closure of said waste gate, said last-named switch being effective when closed to operate said control means to cause movement of said waste gate in an opening direction and signal means energized upon closure of said last-named switch.

10. In an internal combustion engine having an air induction system including a throttle, a supercharger driven by said engine thru a variable ratio gear having means associated therewith for varying said gear ratio, and an intake manifold; the combination of first electrical motor means for driving said throttle, second electrical motor means for moving said gear ratio varying means from a low speed gear ratio position to a high speed gear ratio position, a control element, means responsive to the pressure in said intake manifold for positioning said control element, means for controlling said first motor means in accordance with the position of said element, first switch means operable to a circuit-closing position whenever said intake manifold pressure differs from a predetermined value by a predetermined amount for a predetermined time, second switch means movable to a circuit-closing position as an incident to movement of said throttle to wide open position, and an electrical circuit for energizing said second motor means including said first and second switch means in series.

11. In an internal combustion engine having an air induction system including a throttle, a supercharger driven by said engine thru a variable ratio gear having means associated therewith for varying said gear ratio, and an intake manifold, the combination of first electrical motor means for driving said throttle, second electrical motor means for moving said gear ratio varying means from a high speed gear ratio position to a low speed gear ratio position, a control element, means responsive to the pressure in said intake manifold for positioning said control element, means for controlling said first motor means in accordance with the position of said element, switch means operated to circuit closing position whenever said throttle is in a range of positions extending from closed position to a partially open position and an electrical circuit for energizing said second motor means including said switch means.

12. In an internal combustion engine having an air induction system including a throttle, a supercharger driven by said engine thru a variable ratio gear having means associated therewith for varying said gear ratio, and an intake manifold, the combination of first electrical motor means for driving said throttle, second electrical motor means for moving said gear ratio varying means, a control element, means responsive to the pressure in said intake manifold for positioning said control element, means for controlling said first motor means in accordance with the position of said element, first switch means operable to a circuit-closing position whenever said intake manifold pressure is less than a predetermined value by a predetermined amount, second switch means movable to a circuit-closing position as an incident to movement of said throttle to wide open position, third switch means operated to a circuit-closing position whenever said throttle is in a range of positions extending from closed position to a partially open position, a first electrical circuit for energizing said second motor means for movement of said gear ratio varying means from low speed to high speed position including said first and second switch means in series, and a second electrical circuit for energizing said second motor means for movement of said gear ratio varying means from high speed to low speed position including said third switch means.

13. In an internal combustion engine having an air induction system including a throttle, a supercharger driven by said engine thru a variable ratio gear having means associated therewith for varying said gear ratio, and an intake manifold, the combination of first electrical motor means for driving said throttle, second electrical motor means for moving said gear ratio varying means, a control element, means responsive to the pressure in said intake manifold for positioning said control element, means for controlling said first motor means in accordance with the position of said element, first and second switch means respectively movable to their circuit-closing positions as an incident to movement of said gear ratio varying means to its high speed and low speed positions, third switch means operable to circuit closing position whenever said intake manifold pressure is less than a predetermined value by a predetermined amount, fourth switch means movable to a circuit-closing position as an incident to movement of said throttle to wide open position, fifth switch means operated to circuit-closing position whenever said throttle is in a range of positions extending from closed position to a partially open position, a first electrical circuit for energizing said second motor means for movement of said gear ratio varying means from low speed to high speed position including said second, third and fourth switch means in series, and a second electrical circuit for energizing said second motor means for movement of said gear ratio varying means from high speed to low speed position including first and fifth switch means in series.

14. Motor control apparatus, comprising an electrical motor, a load device to be driven by said motor, variable ratio gear means connecting said motor to said load device, means for varying said gear ratio, means biasing said gear ratio varying means to a low speed position, electrical means operative when energized to shift said gear ratio varying means from said low speed position to a high speed position against the action of said biasing means, means responsive to a condition indicative of the need for operation of said load device for energizing said motor when said condition varies from a predetermined value, and means responsive to a departure of said condition from said value by a predetermined amount for energizing said electrical shifting means.

15. Motor control apparatus, comprising an electrical motor, a load device to be driven by said motor, variable ratio gear means connecting said motor to said load device, means for varying said gear ratio, means biasing said gear ratio varying means to a low speed position, electrical means operative when energized to shift said gear ratio varying means from said position to a high speed position against the action of said biasing means, means responsive to a condition indicative of the need for operation of said load device for energizing said motor when said condition varies from a predetermined value, first means responsive to the degree of departure of said condition from said value for increasing the energization and thereby the speed of said motor continuously upon a continuous increase in said degree of departure, and second means responsive to the degree of departure of said condition from said value and effective when a predetermined degree of departure is exceeded to energize said electrical shifting means.

16. Motor control apparatus, comprising an electrical motor, a load device to be driven by said motor, variable ratio gear means connecting said motor to said load device, means for varying said gear ratio, means biasing said gear ratio varying means to a low speed position, electrical means operative when energized to shift said gear ratio varying means from said low speed position to a high speed position against the action of said biasing means, means responsive to a condition indicative of the need for operation of said load device for energizing said motor when said condition varies from a predetermined value, first means responsive to the degree of departure of said condition from said value for increasing the energization and thereby the speed of said motor continuously upon a continuous increase in said degree of departure, second means responsive to the degree of departure of said condition from said value and effective when a predetermined degree of departure is exceeded to energize said electrical shifting means, and means operative as an incident to the restoration of said condition to said value to apply a braking force to said motor for a predetermined time.

17. Motor control apparatus, comprising a reversible electric motor, a pair of electric circuits for energizing said motor for operation in opposite directions, means for selectively energizing said circuits, braking relay means including an electrical winding connected to said circuit energizing means so as to be energized when either of said circuits is energized, an armature movable between first and second positions in response to energization and de-energization of said winding, contact means operated by said armature to circuit closing position only during movement of said armature between said first and second positions, means for controlling the rate of movement of said armature so as to control the time of closure of said contact means, and braking circuit means including said contact means and effective upon de-energization of either of said pair of circuits to momentarily energize said motor for operation in a direction opposite to that caused by the circuit just de-energized, so as to counteract the tendency of the motor to continue running under the influence of its own inertia.

18. Motor control apparatus, comprising a reversible electric motor, a pair of electric circuits for energizing said motor for operation in opposite directions, means for controlling said circuits including a pair of relays, each said relay being effective when energized to complete one of said circuits, means for selectively energizing said relays, double-throw switch means including two sets of circuit-closing contacts associated with both said relays and operative to close one set of contacts upon energization of each of said relays, means associated with each said set of contacts to hold it closed until energization of the relay associated with the other set, braking relay means including an electrical winding connected to said relay energizing means so as to be energized when either of said relays is energized, an armature movable between first and second positions in response to energization and de-energization of said winding, contact means operated by said armature to circuit closing position only during movement of said armature between said first and second positions, means for controlling the rate of movement of said armature so as to control the time of closure of said contact means, and braking circuit means including said contact means and said double throw switch means and effective upon de-energization of either of said relay means to momentarily energize said motor for operation in a direction opposite to that caused by the relay just de-energized, so as to counteract the tendency of the motor to continue running under the influence of its own inertia.

19. Control apparatus comprising an elongated rod, means for translating said rod in accordance with the variations of a variable condition, a pair of sleeves slidable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced slightly further apart than said extensions when said sleeves are engaging the stops on said rod, and switch means mounted on one of said stop means for operation by one of said extensions.

20. Control apparatus comprising an elongated rod, means for translating said rod in accordance with the variations of a variable condition, a pair of sleeves slidable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced slightly farther apart than said extensions when said sleeves are engaging the stops on said rod, and a pair of switch contacts, one attached to each of said sleeves, said contacts being movable into engagement upon movement of said rod in either direction from the position in which said sleeves engage said stops.

21. Control apparatus, comprising an electrical motor, a power output shaft, power transmitting means connecting said motor and said output shaft, means associated with said power transmitting means for controlling the ratio of the motion of said motor to the motion of said output shaft, said ratio controlling means including a rotatable drum, means for locking said drum against rotation, a pinion shaft journaled in said drum adjacent the periphery thereof and extending parallel to the axis of said drum, a pinion gear on said pinion shaft, a second gear connected to said power output shaft and mating with said pinion gear, means including said motor for applying torque to said pinion gear, said torque applying means being effective when said drum is locked to drive said output shaft thru said pinion gear and said second gear with a predetermined ratio between the speed of said motor and the speed of said output shaft, and means for releasing said drum, said drum releasing means being operative to effectively lock said pinion gear against rotation about its own axis so that said second gear is then driven at the same speed as said drum and said output shaft is driven with a lower ratio between the speed of said motor and the speed of said output shaft.

22. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold; means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said elements, limit switch means associated with each of said motor means, control transfer means including said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and finally the waste gate is closed, while if said pressure increases above said value when the waste gate is closed, the gear ratio varying means is in high speed position and the throttle is open, first the waste gate is opened, then the throttle is partly closed, then the gear ratio varying means is shifted to low speed position and the throttle again opened and finally the throttle is closed, said limit switch means including a first switch movable to circuit-closing position as an incident to closure of said waste gate and a second switch movable to circuit-closing position as an incident to closure of said throttle, a third switch movable to circuit-closing position when the speed of said engine is below a predetermined value, electrical signal means, circuit means for energizing said signal means whenever any of said first, second and third switches is closed, and circuit means effective upon closure of said first switch to cause operation of said control means to move said waste gate in an opening direction.

23. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold, means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said element, limit switch means associated with each of said motor means, control transfer means including said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and finally the waste gate is closed, while is said pressure increases above said value when the waste gate is closed, the gear ratio varying means is in high speed position and the throttle is open, first the waste gate is opened, then the throttle is partly closed, then the gear varying means is shifted to low speed position and the throttle again opened and finally the throttle is closed, said limit switch means including a first switch movable to circuit-closing position as an incident to closure of said waste gate and a second switch movable to circuit-closing position as an incident to closure of said throttle, electrical signal means, and circuit means for energizing said signal means whenever either said first or said second switch is closed.

24. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio, and an intake manifold; means for controlling the pressure in said intake manifold, comprising the combination of first motor means for driving said throttle, second motor means for operating said gear ratio varying means, third motor means for operating said waste gate, a control element, means for positioning said element in accordance with said pressure, motor control means responsive to the position of said element, limit switch means associated with each of said motor means, control transfer means including said limit switch means and effective to place said motor control means selectively in control of said respective motor means so that if said intake manifold pressure falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and finally the waste gate is closed, while if said pressure increases above said value when the waste gate is closed, the gear ratio varying means in high speed position and the throttle open, first the waste gate is opened then the throttle is partly closed, then the gear ratio varying means is shifted to low speed position and the throttle again opened and finally the throttle is closed, said limit switch means including a first switch movable to circuit-closing position as an incident to closure of said waste gate and a second switch movable to circuit closing position as an incident to closure of said throttle, a third switch movable to circuit-closing position when the speed of said engine is below a predetermined value, electrical signal means, and circuit means for energizing said signal means whenever any of said first, second and third switches are closed.

25. Control apparatus, comprising an electrical motor, a power output shaft, power transmitting means connecting said motor and said output shaft, means associated with said power transmitting means for controlling the ratio of the motion of said motor to the motion of said output shaft, said ratio controlling means including a rotatable drum, a flexible band encircling said drum, means for tensioning said band to lock said drum against rotation, a pinion shaft journaled in said drum adjacent the periphery thereof and extending parallel to the axis of said drum, a pinion gear on said pinion shaft, a second gear connected to said output shaft and mating with said pinion gear, means including a third gear driven by said motor for applying torque to said pinion shaft, said torque applying means being effective when said drum is locked to drive said output shaft thru said pinion gear and said second gear with a predetermined ratio between the speed of said motor and the speed of said output shaft, a detent for locking said pinion shaft against rotation with respect to said drum, means biasing said detent into engagement with said pinion shaft, an extension on said detent extending thru said drum to the exterior thereof, said extension being engaged by said band upon tensioning thereof so as to move said detent against its bias and release said pinion shaft, and means for releasing the tension in said band so that said pinion shaft is locked and said output shaft is driven with a lower ratio between the speed of said motor and the speed of said output shaft.

26. Control apparatus, comprising an electrical motor, a power output shaft, power transmitting means connecting said motor and said output shaft, means associated with said power transmitting means for controlling the ratio of the motion of said motor to the motion of said output shaft, said ratio controlling means including a rotatable drum, means for locking said drum against rotation, a pinion shaft journaled in said drum adjacent to the periphery thereof and extending parallel to the axis of said drum, a pinion gear on said pinion shaft, a second gear connected to said output shaft and mating with said pinion gear, means including a worm driven by said motor and a worm wheel fixed on a shaft extending transversely of said drum for applying torque to said pinion gear, said torque applying means being effective when said drum is locked to drive said output shaft thru said pinion gear and said second gear with a predetermined ratio between the speed of said motor and the speed of said output shaft, and means for releasing said drum, said worm and worm wheel having a helix angle sufficiently large that when said drum is released, said transverse shaft stops turning about its own axis and said drum is rotated by said worm and worm wheel, and said second gear is driven at the same speed as said drum and said output shaft is driven with a lower ratio between the speed of said motor and the speed of said output shaft.

27. Apparatus for controlling the pressure in the intake manifold of an internal combustion engine, comprising means for varying said pressure, means responsive to said pressure for controlling said pressure varying means, and means responsive to the speed of said engine for terminating control of said pressure varying means by said pressure responsive means when said engine speed falls below a predetermined value.

28. In an internal combustion engine having an air induction system including a throttle, a supercharger driven by said engine thru a variable ratio gear having means associated therewith for varying said gear ratio, and an intake manifold; the combination of first electrical motor means for driving said throttle, second electrical motor means for moving said gear ratio varying means from a low speed gear ratio position, to a high speed gear ratio position, a control element, means responsive to the pressure in said intake manifold for positioning said control element, means for controlling said first motor means in accordance with the position of said element, first switch means operable to a circuit-closing position whenever said intake manifold pressure differs from a predetermined value by a predetermined amount, first circuit means including said first switch means and effective when completed to cause operation of said first motor means at high speed, second circuit means including said first switch means and time controlled means effective to close a pair of contacts when said first switch means has been closed for a predetermined time, second switch means movable to a circuit-closing position as an incident to movement of said throttle to wide open position, and an electrical circuit for energizing said second motor means including said second switch means and said pair of contacts in series.

29. In an internal combustion engine having an air induction system including a throttle, a supercharger driven by said engine thru a variable ratio gear having means associated therewith for varying said ratio to shift said supercharger from a low speed to a high speed, and an intake manifold; means for controlling the pressure in said manifold comprising the combination of means responsive to said pressure, first motor means for positioning said throttle, second motor means for operating said gear ratio varying means, means including said pressure responsive means, for controlling said first motor means to maintain said pressure at a substantially constant predetermined value, so that the variation of brake horsepower with atmospheric pressure when said pressure is maintained constant follows a first characteristic when said gear ratio varying means is in its low speed position and a second lower characteristic when said gear ratio varying means is in its high speed position, and means for controlling said second motor means including a device responsive to the position of said throttle and a device responsive to said manifold pressure, said last-named means being effective to operate said gear ratio varying means from low speed to high speed only when said throttle is fully open and said pressure has decreased to a second value sufficiently lower than said first value so that the brake horsepower and atmospheric pressure are substantially equal to the coordinates of a point on said second characteristic.

30. Control apparatus for an internal combustion engine comprising throttle means for controlling the flow of air to said engine, means responsive to the pressure in the intake manifold of said engine for controlling said throttle means, said pressure responsive means being effective upon an increase in said pressure above a predetermined value to cause operation of said throttle means toward closed position so as to restore said pressure to said value, and means indicative of the speed of said engine for discontinuing the control of said throttle means by said pressure responsive means when the engine speed falls below a predetermined value.

31. In an internal combustion engine having an air induction system including a supercharger driven by a turbine powered by the exhaust gases from said engine and controlled by a waste gate, a throttle, another supercharger driven by said engine thru a variable ratio gear and having means associated therewith for varying said gear ratio; means for controlling the power output of said engine comprising the combination of first motor means for driving said throttle, second motor means for operating said gear ratio varying means, third motor means for operating said waste gate, a control element, means for positioning said element in accordance with said power output, motor control means responsive to the position of said element, first limit control means responsive to the position of said throttle, second limit control means responsive to the position of said gear ratio varying means, third limit control means responsive to the position of said waste gate, and control transfer means including said limit control means and effective to place said motor control means selectively in control of said respective motor means so that if said power output falls below a predetermined value when the throttle is less than full open, the gear ratio varying means is in low speed position and the waste gate is open, first the throttle is opened wide, then the gear ratio varying means is shifted to high speed position and the throttle partially closed, then the throttle is again opened wide and finally the waste gate is closed, while if said power output increases above said value when the waste gate is closed, the gear ratio varying means is in high speed position and the throttle is open, first the waste gate is opened, when the throttle is partly closed, then the gear ratio varying means is shifted to low speed position and the throttle again opened and finally the throttle is closed.

32. In an internal combustion engine having an air induction system including a supercharger driven by a turbine powered by the exhaust gases from said engine and controlled by a waste gate, a throttle, and another supercharger driven by said engine thru a variable ratio gear and having means associated therewith for varying said gear ratio; means for controlling the power output of said engine comprising the combination of motor means for operating said waste gate, means for controlling said motor in accordance with said power output, first limit control means responsive to the position of said throttle, second limit control means responsive to the position of said gear ratio varying means, and means including said first and second limit control means for preventing operation of said waste gate toward closed position until said throttle is wide open and said gear ratio varying means is in its high speed position.

33. In an internal combustion engine having an air induction system including a supercharger driven by a turbine powered by the exhaust gases from said engine and controlled by a waste gate, and another supercharger driven by said engine thru a variable ratio gear and having means associated therewith for varying said gear ratio; means for controlling the power output of said engine comprising the combination of motor means for operating said gear ratio varying means, means for controlling said motor means in accordance with said power output, limit control means responsive to the position of said waste gate, and means including said limit control means for preventing operation of said gear ratio varying means in a speed decreasing direction until said waste gate is wide open.

34. In an internal combustion engine having an air induction system including a supercharger driven by a turbine powered by the exhaust gases from said engine and controlled by a waste gate, a throttle, and another supercharger driven by said engine thru a variable ratio gear and having means associated therewith for varying said gear ratio; means for controlling the power output of said engine comprising the combination of motor means for operating said gear ratio varying means, means for controlling said motor means in accordance with said power output, first control means responsive to the position of said throttle, second control means responsive to the position of said waste gate, and means including said first and second control means for preventing operation of said gear ratio varying means in a speed decreasing direction until said waste gate is wide open and said throttle is in a position spaced from its full open position.

35. In an internal combustion engine having an air induction system including a supercharger driven by the engine thru a variable ratio gear and having means associated therewith for varying said gear ratio; means for controlling the power output of said engine, comprising the combination of motor means for operating said gear ratio varying means, a control element, means for positioning said element in accordance with said power output, means responsive to the position of said element for controlling said motor means, means responsive to the position of said throttle, time delay means, and means including said throttle position responsive means and said time delay means for preventing operation of said gear ratio varying means in a speed decreasing direction until a predetermined time after said throttle has moved to a position spaced from its full open position.

36. In an internal combustion engine having an air induction system including a throttle, a supercharger driven thru a variable ratio gear having means associated therewith for varying said gear ratio, means responsive to the power output of said engine for controlling said throttle to maintain said power output at a substantially constant value, means responsive to the position of said throttle, second power output responsive means, and means including said throttle position responsive means and said second power output responsive means for operating said gear ratio varying means to increase the supercharger speed when said throttle is wide open and said power output falls below a predetermined value lower than said constant value.

37. In an internal combustion engine having an air induction system including a throttle, a supercharger driven thru a variable ratio gear having means associated therewith for varying said gear ratio, means responsive to the power output of said engine for controlling said throttle to maintain said power output at a substantially constant value, means responsive to the position of said throttle, second power output responsive means, time delay means and means including said throttle position responsive means, said second power output responsive means, and said time delay means for operating said gear ratio varying means to increase the supercharger speed when said throttle is wide open and said pressure remains below a value lower than said constant value for a predetermined time.

38. Motor control apparatus, comprising a reversible electrical motor, a pair of electrical circuits for energizing said motor for operation in opposite directions, switch means for selectively completing said circuits, said circuits having a common branch, a variable electrical resistance in said branch for controlling the speed of said motor, means including a control element for operating said switch means, means for positioning said element to control said motor, said element having a normal position in which said motor is not operated and being effective upon movement from said normal position to operate said switch means to close said circuits selectively in accordance with its direction of movement and means responsive to continued movement of said element in the same direction after an operation of said switch means to vary said resistance in a speed increasing sense.

39. Control apparatus comprising an elongated rod, means for translating said rod in accordance with the variations of a variable condition, a pair of sleeves slidable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced farther apart than said extensions when said sleeves are engaging the stops on said rod so that substantially no force is then applied to said rod thru said sleeves, and switch operating means carried by one of said stop means in alignment with one of said extensions for engagement thereby.

40. Control apparatus comprising an elongated rod, means for translating said rod in accordance with the variations of a variable condition, a pair of sleeves slidable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced farther apart than said extensions when said sleeves are engaging the stops on said rod, switch means mounted on one of said stop means for operation by one of said extensions, and means for adjusting said pair of stationary stop means longitudinally of said rod.

41. Control apparatus comprising an elongated rod, means for translating said rod in accordance with the variations of a variable condition, a pair of sleeves slidable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said spring means being effective to permit continued movement of said rod after engagement of one of said extensions by its associated stop means, and switch means mounted on one of said stop means for operation by one of said extensions.

42. Control apparatus, comprising a control element to be positioned in accordance with the magnitude of a variable pressure plus an increment variable in accordance with the rate of change of said pressure, a flexible diaphragm separating two expansible chambers, a passage connecting said chambers, a restriction in said passage, a sealed expansible bellows mounted on said diaphragm in one of said chambers, means biasing said element into engagement with the free end of said bellows so that said element responds to movements of said bellows and of said diaphragm, means biasing said diaphragm for movement toward said element, and means for supplying said one chamber with fluid at said variable pressure.

43. Control apparatus, comprising condition changing means, an electrical motor for driving said condition changing means, said motor being normally stationary, variable ratio gear means connecting said motor to said condition changing means, means for varying said gear ratio, means biasing said gear ratio varying means to a low speed position, electrical means operative when energized to shift said gear ratio varying means from said low speed position to a high speed position, means responsive to a departure of said condition from a predetermined value for energizing said motor to drive said condition changing means in a direction to restore said condition to said value, and means responsive to a departure of said condition from said value by a predetermined amount for energizing said electrical shifting means.

44. Control apparatus, comprising condition changing means, an electrical motor for driving said condition changing means, said motor being normally stationary, variable ratio gear means connecting said motor to said condition changing means, means for varying said gear ratio, means biasing said gear ratio varying means to a low speed position, electrical means operative when energized to shift said gear ratio varying means from said low speed position to a high speed position, means responsive to a departure of said condition from a predetermined value for energizing said motor to drive said condition changing means in a direction to restore said condition to said value, first means responsive to the degree of departure of said condition from said value for increasing the energization and thereby the speed of said motor continuously upon a continuous increase in said degree of departure, and second means responsive to the degree of departure of said condition from said value and effective when a predetermined degree of departure is exceeded to energize said electrical shifting means.

45. Control apparatus comprising an elongated rod, means for reciprocating said rod in accordance with the variations of a variable condition, a pair of sleeves reciprocable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced slightly farther apart than said extensions when said sleeves are engaging the stops on said rod, an electrical resistance member supported by one of said sleeves, and a contact member slidable along said resistance and supported by the other of said sleeves.

46. Control apparatus comprising an elongated rod, means for reciprocating said rod in accordance with the variations of a variable condition, a pair of sleeves reciprocable on said rod, compression spring means retained between said sleeves and tending to separate said sleeves, a pair of spaced stops on said rod for limiting the separation of said sleeves, a lateral extension on each of said sleeves, said extensions being normally spaced apart, a pair of stationary stop means, each adapted to engage one of said extensions to limit the movement thereof by said rod, said stop means being spaced slightly farther apart than said extensions when said sleeves are engaging the stops on said rod, and a pair of control elements adapted to produce a control effect varying in accordance with the relative positions of said elements, each of said elements being connected to one of said sleeves for concurrent movement therewith.

47. Control apparatus comprising a movable member, means for translating said member in accordance with the variations of a variable condition, a pair of elements carried by said member and movable with respect to said member, spring means retained between said elements and tending to separate said elements, a pair of spaced stops on said member for limiting the separation of said elements, an extension on each of said elements, said extensions being normally spaced apart, a pair of stationary stop means, each adapted to engage one of said extensions to limit the movement thereof by said member, said stop means being spaced slightly farther apart than said extensions when said elements are engaging the stops on said member, and switch means mounted on one of said stop means for operation by engagement with one of said extensions.

48. Control apparatus comprising a movable member, means for translating said member in accordance with the variations of a variable condition, an actuating element carried by said member and movable with respect to said member, a stop on said member for limiting the movement of said element in one direction, spring means biasing said element against said stop, an extension on said element, an electrical switch of the snap-action type having an operating pin and a spring biasing said pin to a first switch-operating position but permitting movement of said pin to a second switch-operating position, said switch spring being weaker than said spring means, and means stationarily supporting said switch with said pin lying in the path of said extension, so that upon engagement of said pin by said extension, said pin is moved to its second position and thereafter said spring means permits continued movement of said member.

49. Control apparatus comprising a movable member, a pair of double-throw switches to be successively actuated from a first circuit-closing position to a second circuit-closing position upon a unidirectional movement of said member, said switches being so arranged with respect to the movement of said member that when said member is in an intermediate position one of said switches is in its first position and the other is in its second position, a pair of switch actuating elements, each associated with one of said switches, and resilient means connecting said elements to said member for concurrent movement therewith, said resilient means being effective to permit continued movement of said member after engagement of said switches by said elements.

50. Control apparatus comprising an elongated rod, a pair of double-throw switches to be successively actuated from a first circuit-closing position to a second circuit-closing position upon a unidirectional movement of said rod, said switches being so arranged with respect to the movement of said member that when said rod is in an intermediate position one of said switches is in its first position and the other is in its second position, switch actuating means carried by said rod including a pair of lateral extensions aligned with said switches, a pair of switch actuating elements, and a pair of resilient supporting means, each connecting one of said actuating elements to one of said extensions for concurrent movement therewith, each said resilient means being effective to permit continued movement of said member after operation of its associated switch by its associated actuating element.

51. Control apparatus as in claim 50, in which each of said resilient means includes a spring, and means for individually adjusting the force of said springs.

52. Control apparatus as in claim 51, in which said switches are of the snap-action type having an operating pin and a switch spring biasing said pin to a first switch-operating position corresponding to said first circuit-closing position but permitting movement of said pin to a second switch-operating position corresponding to said second circuit-closing position, and in which the springs in said resilient means are stronger than said switch springs.

53. Control apparatus as in claim 49, including an electrical device, and electrical circuits including said switches for deenergizing said device when said member is in said intermediate position and energizing said device when said member departs from said intermediate position.

LEIGHTON LEE, II.

(References on following page)

REFERENCES CITED

The following references are of record in the file of this patent:

UNITED STATES PATENTS

| Number | Name | Date |
|---|---|---|
| Re. 13,514 | Ryan | Jan. 14, 1913 |
| 856,967 | Lewis | June 11, 1907 |
| 1,500,851 | Scott | July 8, 1924 |
| 1,508,796 | Kaminski | Sept. 16, 1924 |
| 1,549,921 | Oberschmidt | Aug. 18, 1925 |
| 1,586,233 | Anschutz-Kaempfe | May 25, 1926 |
| 1,661,469 | Ferris | Mar. 6, 1928 |
| 1,757,986 | Whittier | May 13, 1930 |
| 1,822,645 | Crane | Sept. 8, 1931 |
| 1,828,564 | Hardesty | Oct. 20, 1931 |
| 1,869,034 | Whittingham | July 26, 1932 |
| 2,047,984 | Riggs | July 21, 1936 |
| 2,050,020 | Schmidt | Aug. 4, 1936 |
| 2,088,954 | Gregg | Aug. 3, 1937 |
| 2,128,795 | Bishop | Aug. 30, 1938 |
| 2,155,681 | Price | Apr. 25, 1939 |
| 2,157,267 | Madle | May 9, 1939 |
| 2,217,364 | Halford et al. | Oct. 8, 1940 |
| 2,222,329 | Watts | Nov. 19, 1940 |
| 2,228,239 | Ammann | Jan. 14, 1941 |
| 2,231,686 | Shaw | Feb. 11, 1941 |
| 2,233,319 | Lozivit | Feb. 25, 1941 |
| 2,283,175 | Berger | May 19, 1942 |
| 2,285,344 | Marples | June 2, 1942 |
| 2,297,235 | Muller | Sept. 29, 1942 |
| 2,332,985 | Bullen | Oct. 26, 1943 |
| 2,374,708 | Shoults | May 1, 1945 |
| 2,390,581 | Gille | Dec. 11, 1945 |
| 2,403,398 | Reggio | July 2, 1946 |
| 2,454,038 | Crever | Nov. 16, 1948 |

FOREIGN PATENTS

| Number | Country | Date |
|---|---|---|
| 781,793 | France | Mar. 4, 1935 |
| 548,778 | Great Britain | Oct. 23, 1942 |